US012755987B2

(12) United States Patent
Sankarasubramanian et al.

(10) Patent No.: US 12,755,987 B2
(45) Date of Patent: Oct. 6, 2026

(54) REACTANT-TRANSPORT ENGINEERING FOR HIGH-POWER DIRECT LIQUID-FUEL/OXIDANT FUEL CELLS

(71) Applicant: Washington University, St. Louis, MO (US)

(72) Inventors: Shrihari Sankarasubramanian, St. Louis, MO (US); Zhongyang Wang, St. Louis, MO (US); Vijay K. Ramani, St. Louis, MO (US)

(73) Assignee: Washington University, St. Louis, MO (US)

( * ) Notice: Subject to any disclaimer, the term of this patent is extended or adjusted under 35 U.S.C. 154(b) by 1056 days.

(21) Appl. No.: 17/806,622

(22) Filed: Jun. 13, 2022

(65) Prior Publication Data

US 2022/0407088 A1 Dec. 22, 2022

Related U.S. Application Data

(60) Provisional application No. 63/202,594, filed on Jun. 17, 2021.

(51) Int. Cl.
*H01M 8/0258* (2016.01)
*H01M 8/22* (2006.01)

(52) U.S. Cl.
CPC ........... *H01M 8/0258* (2013.01); *H01M 8/22* (2013.01); *H01M 2250/20* (2013.01)

(58) Field of Classification Search
CPC ... H01M 8/0258; H01M 8/22; H01M 2250/20
See application file for complete search history.

(56) References Cited

U.S. PATENT DOCUMENTS

| | | | | |
|---|---|---|---|---|
| 7,964,301 B2 | 6/2011 | Fischel et al. | | |
| 2010/0196800 A1* | 8/2010 | Markoski | H01M 8/1011 429/523 | |
| 2019/0312293 A1* | 10/2019 | Ramani | H01M 8/1004 | |
| 2020/0052310 A1* | 2/2020 | Song | H01M 8/0226 | |

FOREIGN PATENT DOCUMENTS

| | | | |
|---|---|---|---|
| CN | 109755606 A | 5/2019 | |
| WO | WO-2007039793 A2 * | 4/2007 | H01M 4/8605 |

OTHER PUBLICATIONS

Effects of channel geometry and electrode architecture on reactant transportation in membraneless microfluidic fuel cells: A review (Year: 2021).*
Direct borohydride fuel cell using Ni-based composite anodes (Year: 2010).*
Scott et al., "The impact of mass transport and methanol crossover on the direct methanol fuel cell", Journal of Power Sources, 1999, vol. 83, pp. 204-216.

* cited by examiner

*Primary Examiner* — Brian R Ohara
*Assistant Examiner* — Patrick Marshall Greene
(74) *Attorney, Agent, or Firm* — Armstrong Teasdale LLP

(57) ABSTRACT

Described herein are flow field plates comprising a flow field pattern and fuel cells comprising the flow field plates comprising a flow field pattern. The flow field plates and fuel cells are applicable to fuel cells and stacks over a range of sizes and fuel/oxidant combinations as long as the fuel and oxidant are incompressible liquids.

20 Claims, 27 Drawing Sheets

REACTANT-TRANSPORT ENGINEERING FOR HIGH-POWER DIRECT LIQUID-FUEL/OXIDANT FUEL CELLS

CROSS-REFERENCE TO RELATED APPLICATIONS

This application claims the benefit of priority to U.S. Provisional Application No. 63/202,594 filed Jun. 17, 2021, the contents of which is hereby incorporated by reference in its entirety.

GOVERNMENT SUPPORT CLAUSE

This invention was made with government support under N00014-16-1-2833 awarded by the Office of Naval Research (ONR). The government has certain rights in the invention.

FIELD OF THE DISCLOSURE

Described herein are flow field plates comprising a flow field pattern and fuel cells comprising the flow field plates comprising a flow field pattern. The flow field plates are configured according to discovered rules for designing high power direct liquid/oxidant fuel cells. These rules identify an optimal flow regime range, broadly applicable to liquid-fed fuel cells, in terms of the standard dimensionless Reynolds number (Re) and the Damkohler number (Da). The present disclosure is applicable to fuel cells and stacks over a range of sizes and fuel/oxidant combinations as long as the fuel and oxidant are incompressible liquids.

BACKGROUND OF THE DISCLOSURE

Direct sodium borohydride fuel cells (DBFCs) operate at close to twice the voltage of polymer electrolyte membrane fuels (PEMFCs) and yield high-power densities. High-voltage operation is enabled by the fact that the standard thermodynamic cell voltage of a $NaBH_4/H_2O_2$ DBFC is 3.01 V, a significant enhancement over the 1.23 V theoretically obtainable with a traditional $H_2/O_2$ cell. The fuel, $NaBH_4$, has a high theoretical energy density of 9.3 kWh $kg^{-1}$ and specific capacity of 5.67 kAh $kg^{-1}$, offering considerable advantages over competing technologies. Typical fuel streams include dissolved KOH to stabilize $NaBH_4$, leading to lower practical energy densities. Dissolved $H_2O_2$ (stabilized in an acidic solution) serves as a safe and energy-dense oxidant.

A critical bottleneck in the development of these high-voltage DBFCs has been the need to stabilize $NaBH_4$ in an alkaline solution and the $H_2O_2$ oxidant in an acidic solution to prevent the disproportionation of both species. Maintaining the anolyte-catholyte pH differential during operation requires an effective separator architecture. In the past, DBFCs have been primarily demonstrated with a uniform pH across the cell using either a cation exchange membrane (CEM) or an anion exchange membrane (AEM) separator. The constraints introduced by the lack of a pH differential between the catholyte and anolyte have hindered these cells from achieving the potential cell voltage of 3.01 V either due to fuel and oxidant crossover or due to the use of $O_2$ as the oxidant.

DBFCs can use several oxidants, including $O_2$, air, and $H_2O_2$. The key advantage of the liquid-fed DBFC over the $H_2/O_2$ gas-fed fuel cell is its high cell operating voltage, with an ability to produce practically useful current densities at 1.5 V. However, few reports exist of DBFCs with OCVs >1.8 V since most configurations use either anion or cation exchange separators that allow facile fuel-oxidant intermixing. state-of-the-art DBFCs have yielded no current at 1.5 V. Engineering the anode-separator interface to ensure an alkaline environment at the anode is imperative for DBFCs to achieve high OCV values, as the BOR exhibits a more negative potential at high pH and hence is competitive with the HOR. Thus, the measured and reported OCVs from prior studies were understood to be a mixed potential with contributions from both reactions, with a strong pH dependence.

A high-voltage $NaBH_4/H_2O_2$ DBFC can be demonstrated by maintaining a sharp pH differential using a pH gradient-enabled microscale bipolar interface (PMBI). One such known PMBI consists of a 175-μm Nafion CEM that can impede the permeability of $OH^-$ and $BH_4^-$ from anode to cathode and a very thin (~8 nm) triblock copolymer-based anion exchange ionomer (AEI) that serves as a proton barrier (Wang et al., Efficient pH-gradient-enabled microscale bipolar interfaces in direct borohydride fuel cells. Nat. Energy 4, 281-289). The AEI serves as the anode binder, covers the anode catalyst, and is in intimate contact with the CEM separator, thereby forming the PMBI. The PMBI configuration facilitates maintaining a sharp local pH gradient (0.82 pH units/nm on average) at the borohydride oxidation reaction (BOR) electrocatalytic site. A state-of-the-art current density of 330 mA $cm^{-2}$ at 1.5 V and a peak power density of 630 mW $cm^{-2}$ at 1.0 V have been obtained by incorporating this configuration in a DBFC. But it should be noted that the system using a PMBI cannot achieve the 3.01 V theoretical cell voltage due to the unavoidable penalty from water junction potential at the interface between the AEI binder and the CEM separator.

This known system exhibited a relatively low Faradaic efficiency of 50% due to the parasitic evolution of $H_2$ by the hydrolysis of $NaBH_4$. The $H_2$ evolution results in a mixed potential at the anode due to the occurrence of both the BOR ($E^0$=−1.24 V versus standard hydrogen electrode [SHE]) and the hydrogen oxidation reaction (HOR; $E^0$=−0.83 V versus SHE), lowering the overall cell potential. The $H_2$ surface coverage reduces the available sites for the BOR, effectively deactivating the catalyst. Electrocatalysts exhibiting a combination of high BOR activity and selectivity (by inhibiting $BH_4^-$ hydrolysis, and hence inhibiting HOR) would result in higher faradic efficiency and have been the subject of sustained interest.

Disclosed herein is an efficient way to exclude $H_2$ gas bubbles while maintaining a large residence time during DBFC operation. A state-of-the-art DBFC with an OCV of 1.96 V and a current density of 470 mA $cm^{-2}$ at 1.5 V have been obtained. A peak power density of 890 mW $cm^{-2}$ was achieved at 1.1 V. Using the reactant-transport engineering approach described herein, prior approaches have been exceeded at least by a factor of 1.4.

The present disclosure examines an alternate reactant-transport engineering approach to improve the overall cell potential and cell performance of the DBFC. The reactant-transport engineering approach of the present disclosure examines the impact of reactant flowrate, flow velocity, residence time, and flow regime (via the Reynolds number [Re]) on DBFC performance. Microscale bipolar interfaces are coupled with different flow fields (FFs) in a DBFC to deliver practical current densities at 1.5 V. A current density of 470 mA $cm^{-2}$ at 1.5 V and a peak power density of 890 mW $cm^{-2}$ at 1.1 V are obtained in a PMBI-based DBFC with a 3-channel serpentine FF (3CS-FF) on the reactant side. Moreover, a PMBI-based DBFC with a 1CS-FF yields a high DBFC open circuit voltage (OCV) of 2.02 V. Balancing the competing demands of high residence time to improve BOR rates with high flowrates to detach adsorbed $H_2$, identified herein are critical Re and Damkohler numbers (Da) to efficiently exclude $H_2$ gas bubbles while maintaining large current densities during the operation of a DBFC.

BRIEF DESCRIPTION OF THE DISCLOSURE

In one embodiment, the present disclosure is directed to a flow field plate comprising a flow field pattern; wherein the flow field plate is configured to receive an incompressible liquid fuel stream or an incompressible liquid oxidant stream; wherein the flow field plate is configured to operate at a Reynolds number in the range of from about 300 to about 1200; and wherein the flow field plate is configured to operate at a Damkohler number in the range of from about 200 to about 600.

In another embodiment, the present disclosure is directed to a fuel cell comprising (i) an anode comprising a first flow field plate comprising a flow field pattern; and an incompressible liquid fuel stream; wherein the first flow field plate is configured to operate at a Reynolds number in the range of from about 300 to about 1200; and wherein the first flow field plate is configured to operate at a Damkohler number in the range of from about 200 to about 600; and (ii) a cathode comprising a second flow field plate comprising a flow field pattern; and an incompressible liquid oxidant stream; wherein the second flow field plate is configured to operate at a Reynolds number in the range of from about 300 to about 1200; and wherein the second flow field plate is configured to operate at a Damkohler number in the range of from about 200 to about 600.

In still another embodiment, the present disclosure is directed to a method of using a fuel cell comprising (i) an anode comprising a first flow field plate comprising a flow field pattern; and an incompressible liquid fuel stream; wherein the first flow field plate is configured to operate at a Reynolds number in the range of from about 300 to about 1200; and wherein the first flow field plate is configured to operate at a Damkohler number in the range of from about 200 to about 600; and (ii) a cathode comprising a second flow field plate comprising a flow field pattern; and an incompressible liquid oxidant stream; wherein the second flow field plate is configured to operate at a Reynolds number in the range of from about 300 to about 1200; and wherein the second flow field plate is configured to operate at a Damkohler number in the range of from about 200 to about 600, the method comprising using the fuel cell in a propulsion system of a vehicle.

$$\eta_{BOR} = \frac{E_{anode}}{E^0_{anode}} \times 100.$$

Figure 15:
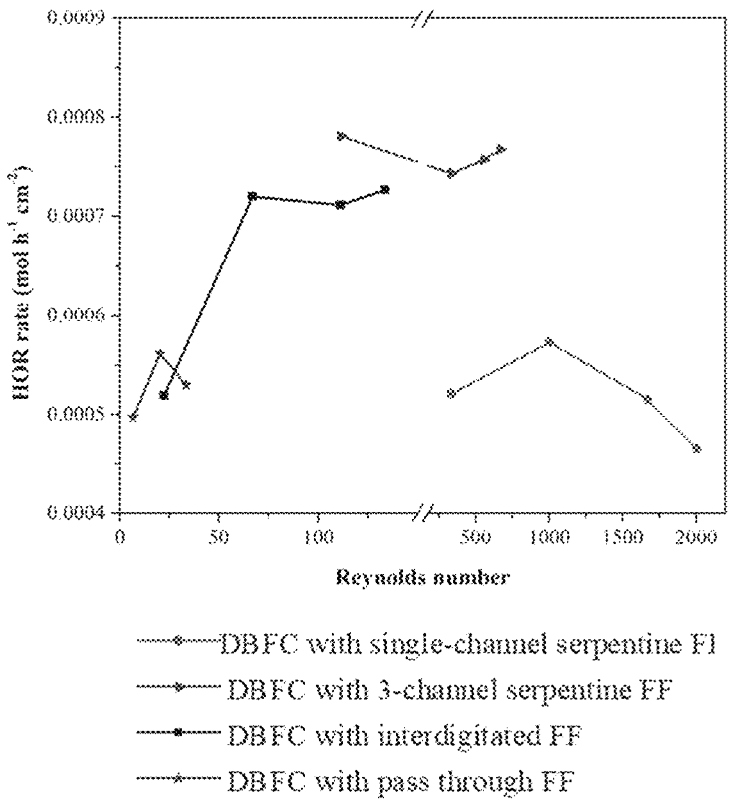

FIG. 15 is an exemplary embodiment depicting relation between Reynolds number hydrogen oxidation (HOR) rate in accordance with the present disclosure.

Figure 16:
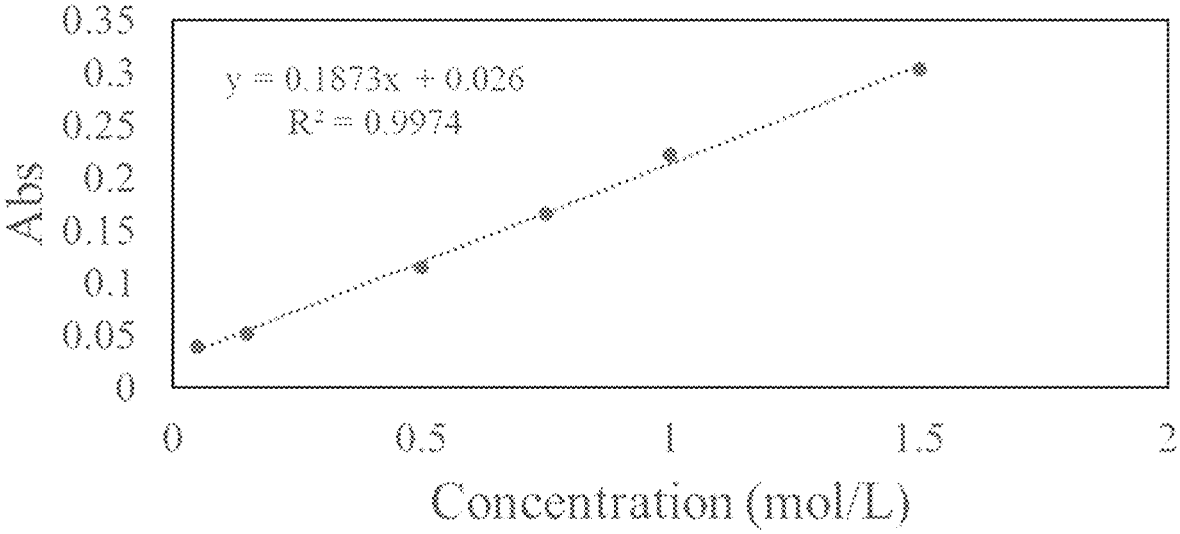

FIG. 16 is an exemplary embodiment depicting calibration curves of standard vanadium ($V^{5+}$) solutions in accordance with the present disclosure.

Figure 17:
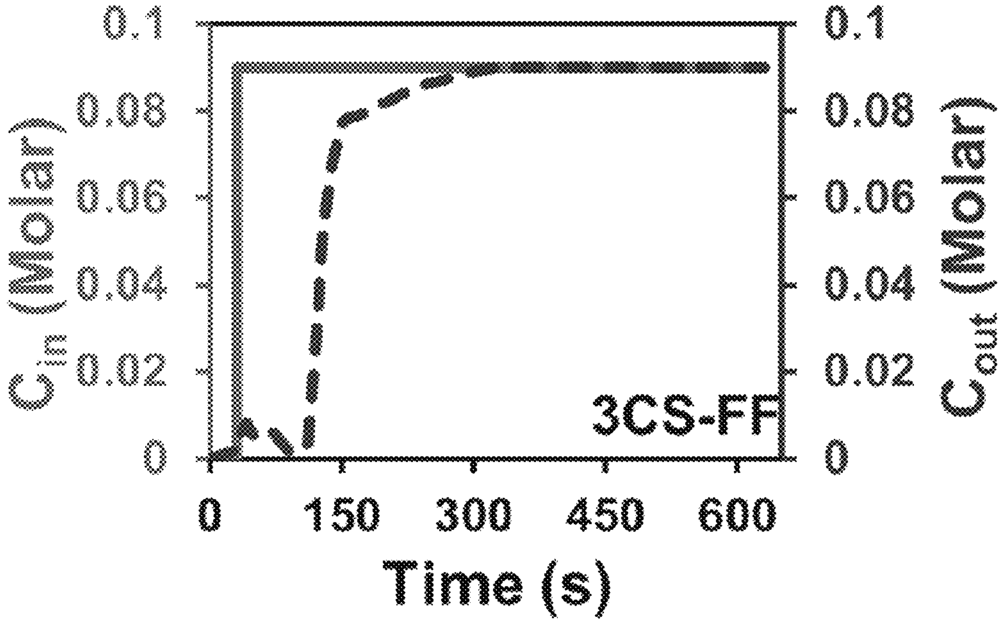

FIG. 17 is an exemplary embodiment depicting anode inlet and exit tracer concentration in a representative residence time distribution (RTD) experiment.

Figure 18:
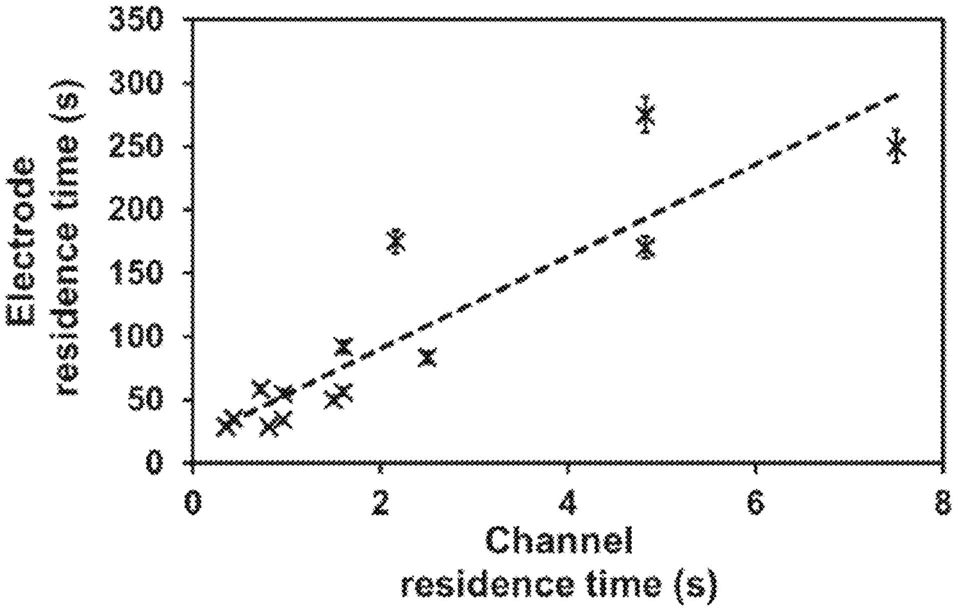

FIG. 18 is an exemplary embodiment depicting the correlation between channel residence time ($\tau_{channel}$) and the electrode pore residence time ($\tau$).

DETAILED DESCRIPTION OF THE DISCLOSURE

Described herein are flow field plates comprising a flow field pattern and fuel cells comprising the flow field plates. The flow field plates are configured according to discovered rules for designing high power direct liquid/oxidant fuel cells. The flow field plates and fuel cells utilize fuels and oxidants that are incompressible liquids.

In many embodiments, the present disclosure is directed to a flow field plate comprising a flow field pattern; wherein the flow field plate is configured to receive an incompressible liquid fuel stream or an incompressible liquid oxidant stream; wherein the flow field plate is configured to operate at a Reynolds number in the range of from about 300 to about 1200; and wherein the flow field plate is configured to operate at a Damkohler number in the range of from about 200 to about 600.

In some embodiments, the flow field plate is configured to operate at a Reynolds number in the range of from about 600 to about 1000.

In some embodiments, the flow field plate is configured to operate at a Damkohler number in the range of from about 400 to about 600.

In some embodiments, the flow field pattern comprises a pattern selected from the group consisting of a single-channel serpentine, a 3-channel serpentine, an interdigitated pattern, a pass-through pattern, a pin-type patten, a pillar-type pattern, a fractal pattern, and combinations thereof.

In some embodiments, the incompressible liquid fuel stream comprises an incompressible liquid fuel component selected from the group consisting of an incompressible liquid fuel, sodium borohydride ($NaBH_4$), potassium borohydride ($KBH_4$), sodium hydroxide (NaOH), potassium hydroxide (KOH), and combinations thereof.

In some embodiments, the incompressible liquid oxidant stream comprises an incompressible liquid oxidant component selected from the group consisting of an incompressible liquid oxidant, hydrogen peroxide ($H_2O_2$), an acid, sulfuric acid ($H_2SO_4$), hydrobromic acid, and combinations thereof.

Generally, the incompressible liquid fuel component and the incompressible liquid oxidant component may each flow at any suitable flow rate known in the art. In some embodiments, the incompressible liquid fuel component has a flow rate in a range of from about 0.1 m/s to about 5 m/s. In some embodiments, the incompressible liquid oxidant component has a flow rate in a range of from about 0.1 m/s to about 5 m/s.

In some embodiments, the incompressible liquid fuel stream has a basic pH and the incompressible liquid oxidant stream has an acidic pH.

In many embodiments, the present disclosure is directed to a fuel cell comprising (i) an anode comprising a first flow field plate comprising a flow field pattern; and an incompressible liquid fuel stream; wherein the first flow field plate is configured to operate at a Reynolds number in the range of from about 300 to about 1200; and wherein the first flow field plate is configured to operate at a Damkohler number in the range of from about 200 to about 600; and (ii) a cathode comprising a second flow field plate comprising a flow field pattern; and an incompressible liquid oxidant stream; wherein the second flow field plate is configured to operate at a Reynolds number in the range of from about 300 to about 1200; and wherein the second flow field plate is configured to operate at a Damkohler number in the range of from about 200 to about 600.

In some embodiments, the first flow field pattern is identical to the second flow field pattern. In some embodiments, the first flow field pattern is different from the second flow field pattern.

In some embodiments, the fuel cell comprises a pH gradient-enabled microscale bipolar interface (PMBI).

Generally, the fuel cell may have any suitable power levels, voltages, and currents known in the art. In some embodiments, the fuel cell has a single cell open circuit voltage in a range of from about 1.6 V to about 2.18 V. In some embodiments, the fuel cell has a power density greater than about 0.1 $mW/cm^2$, and preferably greater than about 0.5 $mW/cm^2$. In some embodiments, the fuel cell has a current density greater than about 50 mA/cm$^2$, and preferably greater than about 100 mA/cm$^2$.

In many embodiments, the present disclosure is directed to a method of using a fuel cell, the method comprising using the fuel cell in a propulsion system of a vehicle. In some embodiments, the vehicle is a weight-sensitive transportation platform. In some embodiments, the vehicle is selected from the group consisting of electric vehicles, submersibles, drones, manned and unmanned aerial vehicles, surface ships, and combinations thereof.

Considerations and Challenges in High-Power DBFCs

Figure 1:
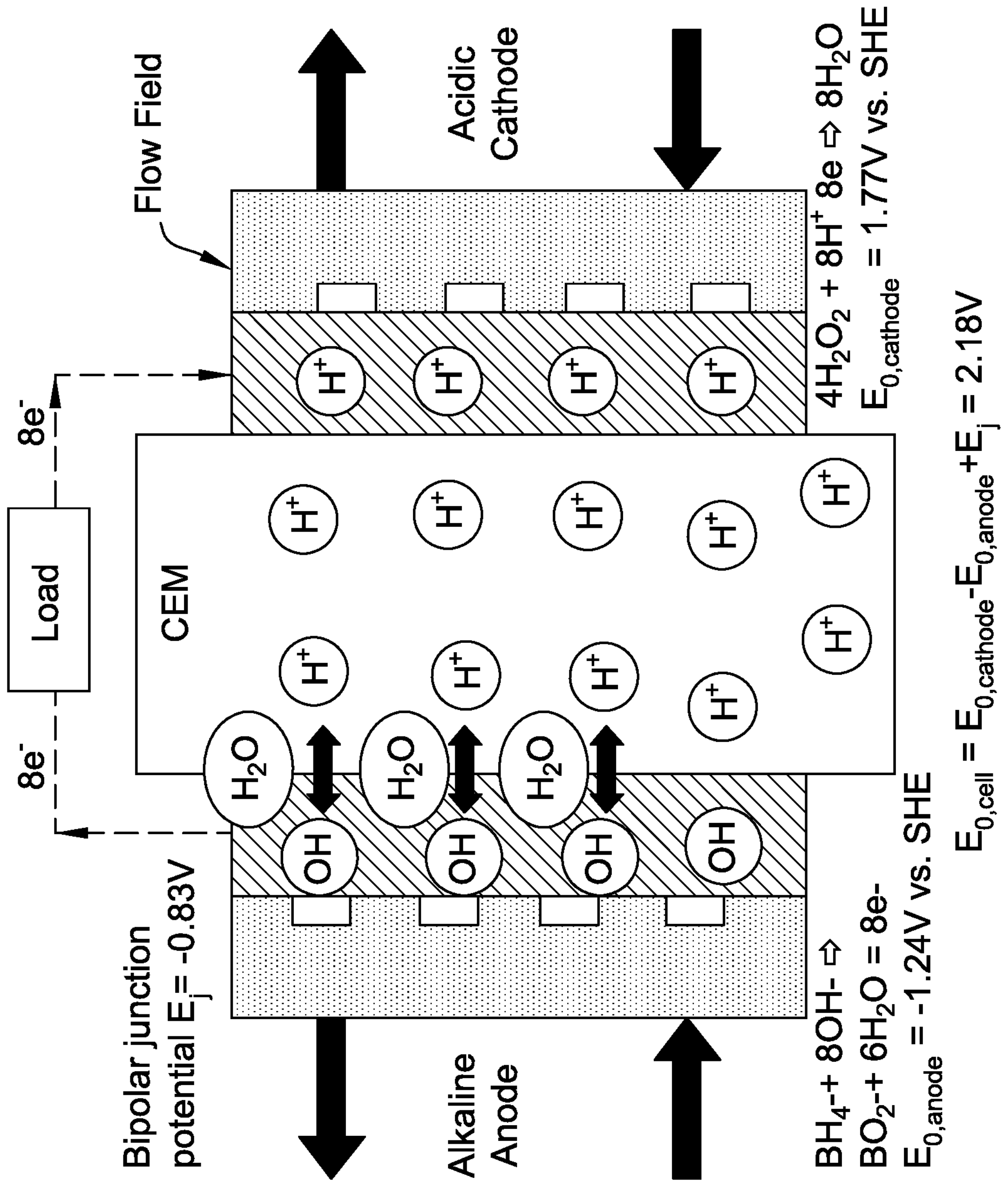
FIG. 1 is an exemplary embodiment depicting a cell mechanism of a pH gradient-enabled microscale bipolar interface-based DBFC in accordance with the present disclosure. The PMBI is located at the junction between a cation exchange membrane (CEM) and an anion exchange ionomer (AEI) binder. The reaction sites on the catalyst particle surface are covered by the AEI binder, which allows for selective transport of hydroxide ions. Thus, the local conditions at the reaction sites are alkaline irrespective of bulk conditions at and beyond the CEM. The flow field (FF) of the cathode is a 3-channel serpentine FF, and the FFs of the anode are varied.

FIG. 1 depicts a DBFC with the PMBI configuration. The AEI covering the surface of the anode catalyst provides an alkaline environment for the BOR, with the pH value at the 40 wt % Pd/C catalyst surface being 13.5. During cell operation, $H_2O$ at the AEI-CEM bipolar interface dissociates into $H^+$ and $OH^-$ to complete the overall electrical circuit. Water dissociation results in an unavoidable junction potential of 0.83 V versus SHE, resulting in a theoretical cell maximum voltage of 2.18 V, as opposed to the 3.01 V expected from only the cathodic and anodic reactions. A second source of OCV loss is the prevalence of side reactions and the resultant mixed potentials at the anode. To maximize the voltage efficiency of a DBFC and concurrently maintain high current densities, the anode transport regimes were engineered by using different FF architectures.

Figure 2A:
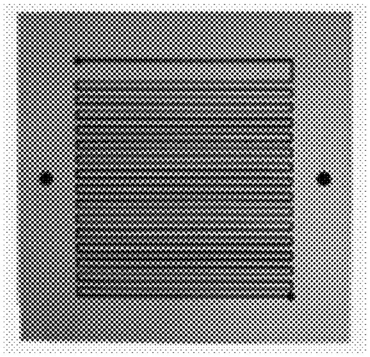
FIG. 2A is an exemplary embodiment depicting the single-channel serpentine FF at the anode and 3-channel serpentine FF at the cathode in accordance with the present disclosure.
Figure 2B:
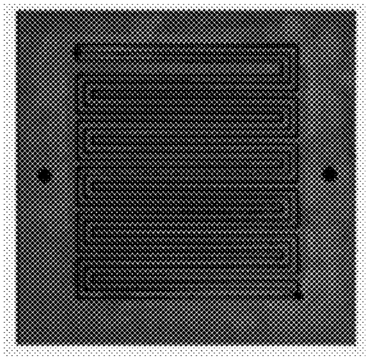
FIG. 2B is an exemplary embodiment depicting the three-channel serpentine FF at the anode and 3-channel serpentine FF at the cathode in accordance with the present disclosure.
Figure 2C:
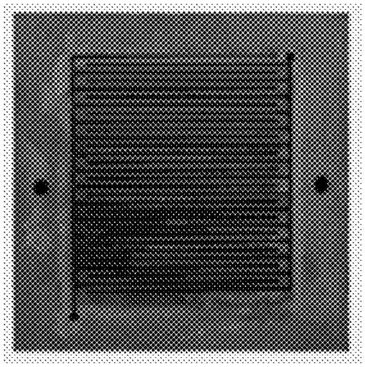
FIG. 2C is an exemplary embodiment depicting the interdigitated FF at the anode and 3-channel serpentine FF at the cathode in accordance with the present disclosure.
Figure 2D:
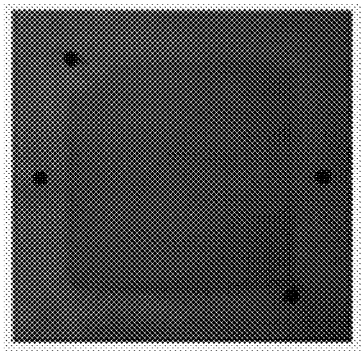
FIG. 2D is an exemplary embodiment depicting the pass-through (no flow channel) FF at the anode and 3-channel serpentine FF at the cathode in accordance with the present disclosure.

The various FFs examined are depicted in FIG. 2, including 1CS-FF (FIG. 2A), 3CS-FF (FIG. 2B), interdigitated FF (ID-FF) (FIG. 2C), and pass-through FF (PT-FF) (no flow channels) (FIG. 2D). Cathodic FFs that supply the reactants for the hydrogen peroxide reduction reaction (HRR) were kept unchanged, and the 3CS-FF was used in all of the cases. The same range of fuel volumetric flowrates was used across the FFs, with the variation in the cross-sectional area of the FFs, allowing examination of the effect of flow velocity on DBFC performance. In situ stability of this DBFC configuration and ex situ stability of the anode and cathode electrodes have been evaluated and shown to satisfy operational requirements.

Figure 3A:
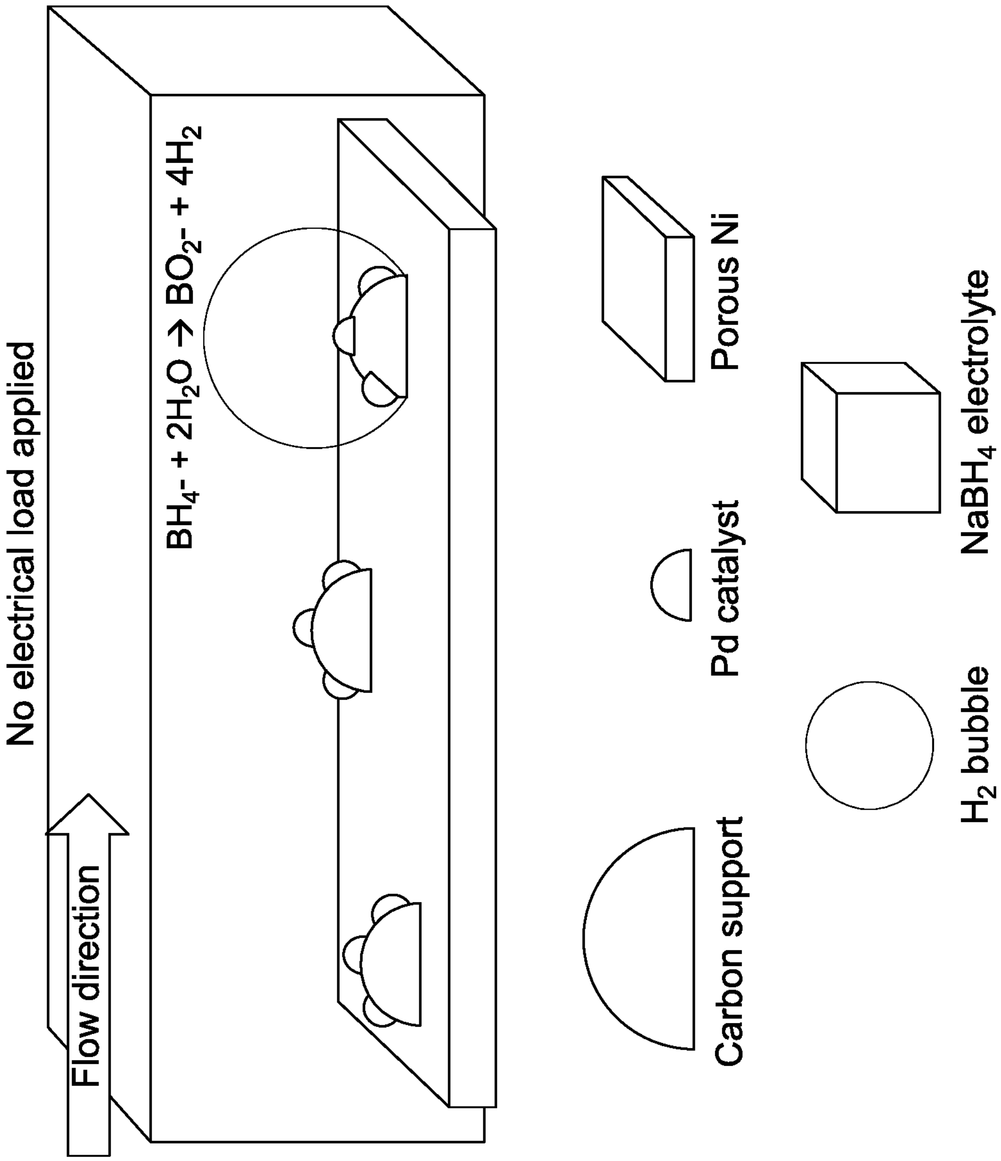
FIG. 3A is an exemplary embodiment depicting electrochemical and chemical reactions at the anode of a typical DBFC without external electrical load being applied in accordance with the present disclosure.
Figure 3B:
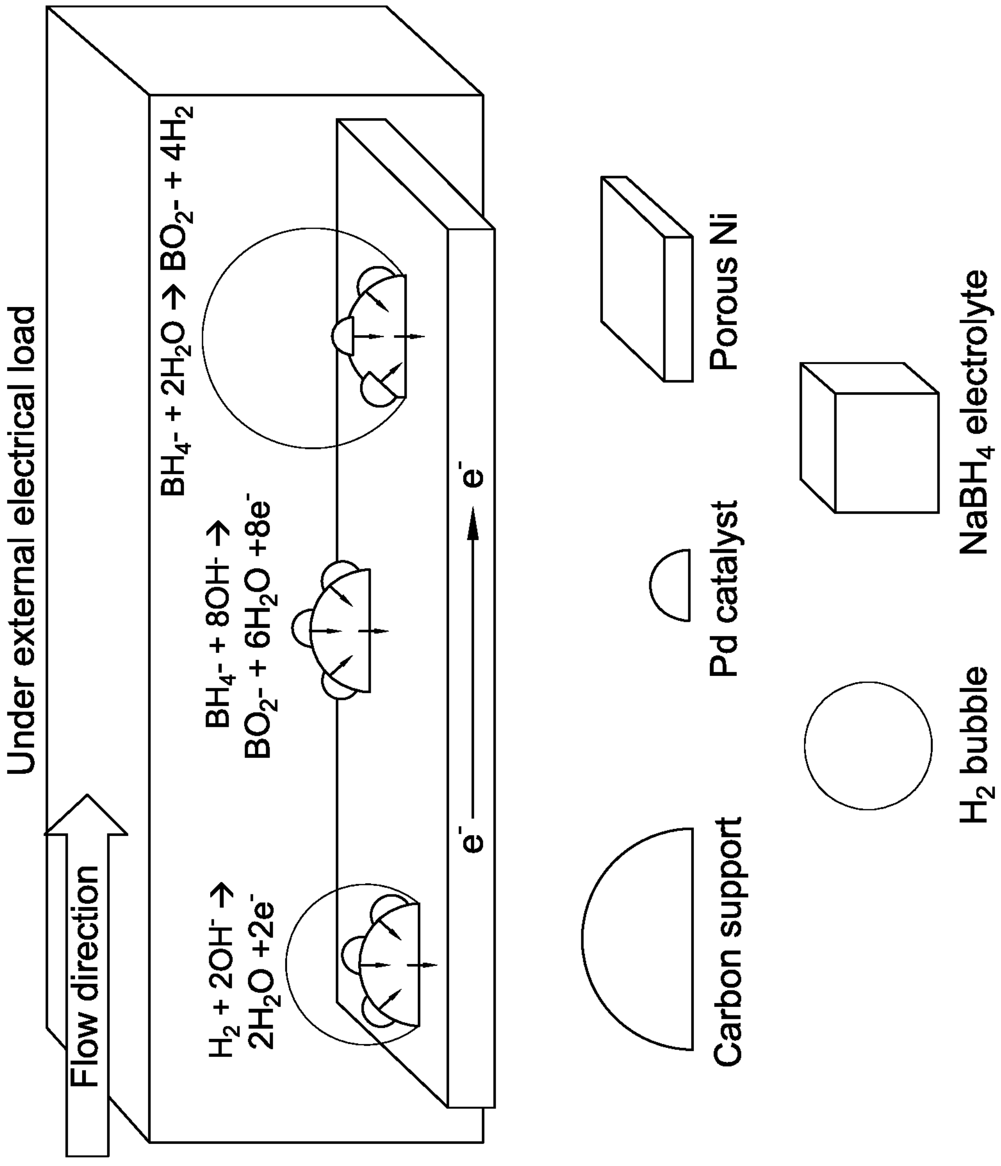
FIG. 3B is an exemplary embodiment depicting electrochemical and chemical reactions at the anode of a typical DBFC with external electrical load being applied in accordance with the present disclosure. The anode consists of Pd/C catalyst supported on porous Ni foam.

FIGS. 3A and 3B summarize the challenges inherent in the BOR. For the purposes of the present disclosure, the anode consists of a porous Ni foam supporting a 40 wt % Pd/C catalyst (although any suitable catalyst known in the art may be utilized). Upon initiating fuel flow into the cell with no external electrical load (FIG. 3A), the hydrolysis of borohydride is catalyzed by Pd. This results in the formation and adsorption of $H_2$ bubbles on the catalyst surface, reducing the available catalytic sites for other reactions. Both at OCV and when an external electrical load is applied (FIG. 3B), a mixed potential is generated due to the occurrence of both the BOR and HOR in parallel. Increasing the fuel flowrate is expected to drag away the adsorbed $H_2$ bubbles and increase the availability of active sites. Nevertheless, in the absence of kinetic selection of the BOR versus HOR through a selective catalyst, competition between $BH_4^-$ hydrolysis, BOR, and HOR still exists, with the trade-off between the rate of each reaction and the residence time of the fuel determining the overall cell performance. Furthermore, the present considerations of reaction competition and flow-based removal of undesired adsorbates is predicated on the existence of well-developed laminar flow and diffusion-dominated transport across a boundary layer. The sensitivity of the DBFC performance to the anolyte Re indicates that transitions in the flow regime can occur even at relatively low flowrates, and DBFC performance is not bound to increase merely with the increasing flowrate.

To summarize, the key considerations when optimizing the BOR electrode are 3-fold. First, it is imperative to limit the contact duration between the catalyst and the electrolyte to limit the chemical dissociation of the $NaBH_4$ to produce $H_2$. Second, in direct opposition to this, it is desirable to increase the contact duration between the electrolyte and electrocatalyst to improve the reactant utilization in the DBFC. Third, the formation, nucleation, and adhesion of $H_2$ gas bubbles on the catalyst surface limit the available sites for the desired BOR, and hence it may be desirable to increase electrolyte velocity to remove the adhering bubbles. Nevertheless, the loss of $H_2$ will compromise the faradaic efficiency, and so the judicious design and selection of a bifunctional BOR-HOR catalyst for the anode is desirable. Thus, designing a high-performance DBFC requires the careful balancing of these considerations. This is illustrated when comparing the performance of DBFCs with different anodic FF architectures.

Reactant-Transport Engineering Approach

Figure 4:
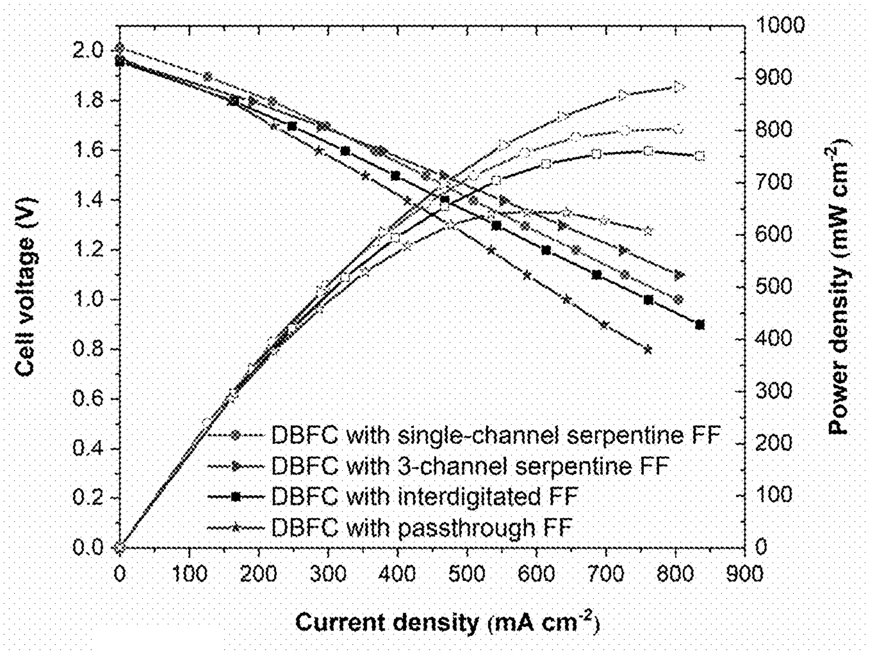
FIG. 4 is an exemplary embodiment depicting the best polarization curves of DBFCs in accordance with the present disclosure. The flowrate for the best performance of the DBFC with single-channel serpentine FF is 2.4 mL $min^{-1}$ $cm^{-2}$. The flowrate for the best performance of the DBFC with 3-channel serpentine FF is 4.8 mL $min^{-1}$ $cm^{-2}$. The flowrate for the best performance of the DBFC with interdigitated FF is 4.8 mL $min^{-1}$ $cm^{-2}$. The flowrate for the best performance of the DBFC with pass-through FF is 4.0 mL $min^{-1}$ $cm^{-2}$.

FIG. 4 depicts the best polarization performance of DBFC cells incorporating the various FFs under consideration on the BOR side. The cell with a 3CS-FF on the BOR side was found to exhibit the best performance in terms of the voltage and peak power density. The OCV of that cell was 1.96 V, and a peak power density of 890 mW cm$^{-2}$ was obtained. A current density of 470 mA cm$^{-2}$ was achieved at 1.5 V (corresponding to a power density of 705 mW cm$^{-2}$). However, a DBFC with 1CS-FF exhibited the highest OCV, 2.02 V.

The focus in the present disclosure is on achieving and sustaining high power densities at operationally relevant voltages (i.e., >1.4 V). As seen in FIGS. 9-12, increasing the fuel and reactant volumetric flux from 0.8 mL min$^{-1}$ cm$^{-2}$ (20 mL min$^{-1}$) to 2.4 mL min$^{-1}$ cm$^{-2}$ (60 mL min$^{-1}$) produced an increase in peak power density by mitigating mass-transport limitations at higher current densities. This linear correlation between increasing flowrates and peak power density was consistently observed for 3CS-FF, ID-FF, and PT-FF even at higher flowrates (i.e., 100 and 120 mL min$^{-1}$) but was seen to break down in the case of the 1CS-FF, in which a flux of 2.4 mL min$^{-1}$ cm$^{-2}$ (60 mL min$^{-1}$) was found to deliver the highest power. The varying cross-sectional areas of these FFs (listed in Table 1) suggested that correlating the power density to the flowrate may be more appropriate, but it was observed that while 3CS-FFs delivered their best performance at 4.8 mL min$^{-1}$ cm$^{-2}$ (120 mL min$^{-1}$), the 1CS-FFs delivered their best performance at 2.4 mL min$^{-1}$ cm$^{-2}$ (60 mL min$^{-1}$), despite having only one-third of the cross sectional area. All of the comparisons were made at the same flowrates (but varying volume fluxes) so as to identify the optimum configuration for best performance at the same pump power consumption.

TABLE 1

Reactant-transport characteristics of FFs used in DBFC.

| Type of FF volumetric flow rate, mL/min) | Flow velocity, m/s | Re | Residence time through flow channel, s | Da × $10^2$ | Mean resident time through electrode, s |
|---|---|---|---|---|---|
| single-channel serpentine (area$_{c/s}$ = 1 mm$^2$) | | | | | |
| 20 | 0.33 | 334 | 4.83 | 10.73 | 170 |
| 60 | 1 | 1002 | 1.61 | 3.93 | 56.67 |
| 100 | 1.67 | 1670 | 0.97 | 2.28 | 34 |
| 120 | 2 | 2004 | 0.81 | 1.88 | 28.33 |
| 3-channel serpentine (area$_{c/s}$ = 3 mm$^2$) | | | | | |
| 20 | 0.11 | 111 | 4.83 | 18.46 | 275 |
| 60 | 0.33 | 334 | 1.61 | 6.17 | 91.67 |
| 100 | 0.56 | 557 | 0.97 | 3.77 | 55 |
| 120 | 0.67 | 668 | 0.81 | 1.96 | 28.33 |

TABLE 1-continued

Reactant-transport characteristics of FFs used in DBFC.

| Type of FF volumetric flow rate, mL/min) | Flow velocity, m/s | Re | Residence time through flow channel, s | Da × $10^2$ | Mean resident time through electrode, s |
|---|---|---|---|---|---|
| interdigitated ($area_{c/s}$ = 15 $mm^2$) | | | | | |
| 20 | 0.022 | 22 | 2.16 | 7.81 | 175 |
| 60 | 0.067 | 67 | 0.72 | 3.61 | 58.33 |
| 100 | 0.11 | 111 | 0.43 | 2.25 | 35 |
| 120 | 0.13 | 134 | 0.36 | 1.86 | 28.33 |
| pass through ($area_{c/s}$ = 50 $mm^2$) | | | | | |
| 20 | 0.007 | 25 | 7.5 | 9.00 | 250 |
| 60 | 0.020 | 76 | 2.5 | 4.32 | 83.33 |
| 100 | 0.033 | 127 | 1.5 | 2.53 | 50 |

Figure 5A:
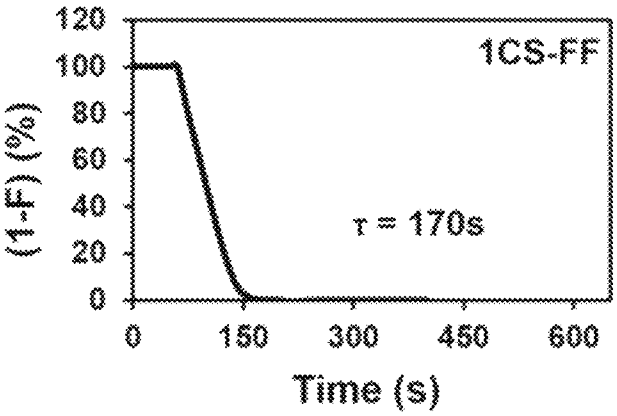
FIG. 5A is an exemplary embodiment depicting reactant residence times at DBFC with single-channel serpentine FF at the anode and 3-channel serpentine FF at the cathode in accordance with the present disclosure.

FIG. 5A depicts the effect of the electrolyte velocity on the OCV. The measured OCV is a mixed potential with contributions from the BOR and HOR. The promise of high operational voltages in a DBFC can be achieved only if the BOR is the dominant reaction. The chemical decomposition of $NaBH_4$ to produce $H_2$ that is subsequently oxidized to water renders the system a $H_2/O_2$ or $H_2/H_2O_2$ fuel cell, with $NaBH_4$ being the $H_2$ storage media (the reason for the ≤1 V OCVs observed in several purported DBFCs known in the art). The selectivity of the BOR catalyst used in the present system means that the major factor lowering the OCV is the blocking of BOR reaction sites by adsorbed $H_2$ bubbles. Thus, at the low velocity limit, dramatic gains in the system OCV are observed, as small gains in flow velocity significantly aid in $H_2$ bubble removal. Given the low velocity needed to remove these bubbles, this effect is not as pronounced at high velocities, and no gains in the OCV are seen with increasing fluid velocity >0.5 m $s^{-1}$.

Figure 5B:
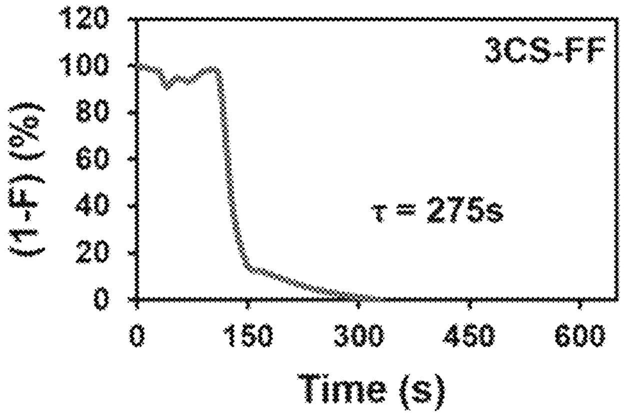
FIG. 5B is an exemplary embodiment depicting reactant residence times at DBFC with 3-channel serpentine FF at the anode and 3-channel serpentine FF at the cathode in accordance with the present disclosure.

FIG. 5B depicts the effect of the flow velocity on the peak power density. The peak power density is influenced by the BOR selectivity of the catalyst. The peak power density increases with increasing velocity as the faster flowing fluid removes $H_2$ bubbles before they have a chance to undergo HOR and additionally frees up reaction sites for the BOR. Above 1 m $s^{-1}$ in cases of the 1CS-FF, the peak power was observed to decrease. This is due to the transition of the flow regime from laminar to turbulent, Re approaching 2,000. The plateauing of the peak power value over 0.4 m $s^{-1}$ indicates that this value of flow velocity is sufficient for bubble detachment, while the decrease after 1 m $s^{-1}$ indicates that the flow regime significantly affects the BOR.

Figure 5C:
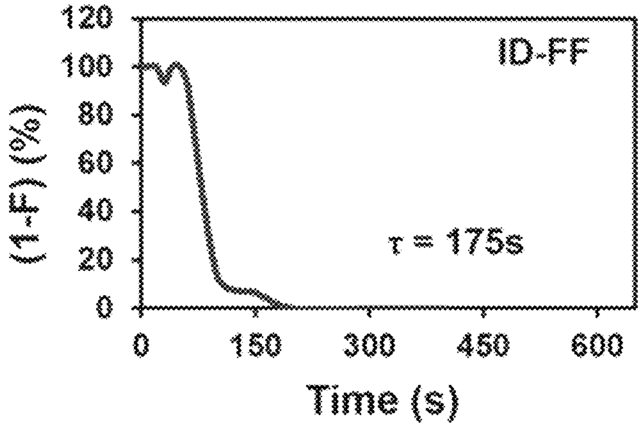
FIG. 5C is an exemplary embodiment depicting reactant residence times at DBFC with interdigitated FF at the anode and 3-channel serpentine FF at the cathode in accordance with the present disclosure.
Figure 5D:
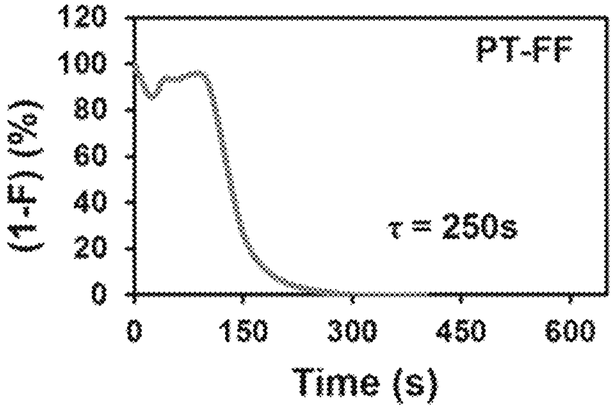
FIG. 5D is an exemplary embodiment depicting reactant residence times at DBFC with pass-through (no flow channel) FF at the anode and 3-channel serpentine FF at the cathode in accordance with the present disclosure.

FIG. 5C depicts the effect of the channel residence time ($\tau_{channel}$) on the peak power density. Higher $\tau_{channel}$ will result in greater chemical production of $H_2$ (limited only by the availability of adsorption sites), which will in turn compete with the BOR. Thus, it is observed that in the case of the 3CS-FF, PT-FF, and ID-FF, the peak power density is inversely corelated with the residence time. While this inverse trend is observed in the case of the 1CS-FF for high residence times (low fluid velocity), the correlation breaks down at high fluid velocities (low residence times) due to the transition in the flow regime. Despite the 3CS-FF and 1CS-FF exhibiting the same residence times, the observed divergence in cell performance indicates that $\tau_{channel}$ is not the primary factor affecting the performance of DBFC.

Following the observation that the electrolyte flow velocity (and its corollary, the residence time) cannot completely account for the observed DBFC performance, the present disclosure turns to the dimensionless Da, which is the ratio of the reaction rate to the transport rate. Given the variety of possible rate law expressions, Da can be defined in general as:

$$Da = kC_{A_0}^{n-1}\tau = \frac{r}{C_{A_0}}\tau \qquad \text{(Equation 1)}$$

where k is the rate constant for a nth order reaction with units of (mol $cm^{-3})^{(1-n)}$ s, $C_{A0}$ is the initial (inlet) concentration of the reactant (1.5 M $NaBH_4$ in 3 M KOH), τ is the porous anode (Ni foam) residence time in seconds, and r is the rate of an nth order reaction in mol $s^{-1}$. Given that i=nFAr and $P_{Peak}=i_{peak}E_{peak}$, where $P_{peak}$ is the peak power, $i_{peak}$ is the peak current, and $E_{peak}$ is the potential corresponding to peak power, the following expression is obtained for the Da for a DBFC:

$$Da = \frac{\frac{P_{peak}}{E_{peak}}}{nFAC_{A_0}}\tau \qquad \text{(Equation 2)}$$

Da captures the effect of the peak power, the residence time through the electrode, and the reactant concentration in one term. An example calculation of Da is provided in the Examples. The residence time in the anode catalyst layer was measured by a residence time distribution (RTD) measurement using a step tracer input (representative inlet and exit tracer concentrations provided in FIG. 17), as detailed in the Examples. FIG. 5 depicts the plots of (1-F) versus t. $F=[c_{out}/c_{in}]_{step}$, where t at (1-F)=0 is taken to be the anode catalyst layer residence time (t) and used in the calculation of Da. The effect of the FFs on the residence time in the catalyst layer was examined by comparing $\tau_{channel}$ with τ. $\tau_{channel}$ was calculated by dividing the volume of the flow channels by the volumetric flowrate. $\tau_{channel}$ and τ were found to be linearly correlated, as depicted in FIG. 18. Thus, the FF channel volume will allow direct control of the residence time in the catalyst layer.

Figure 6:
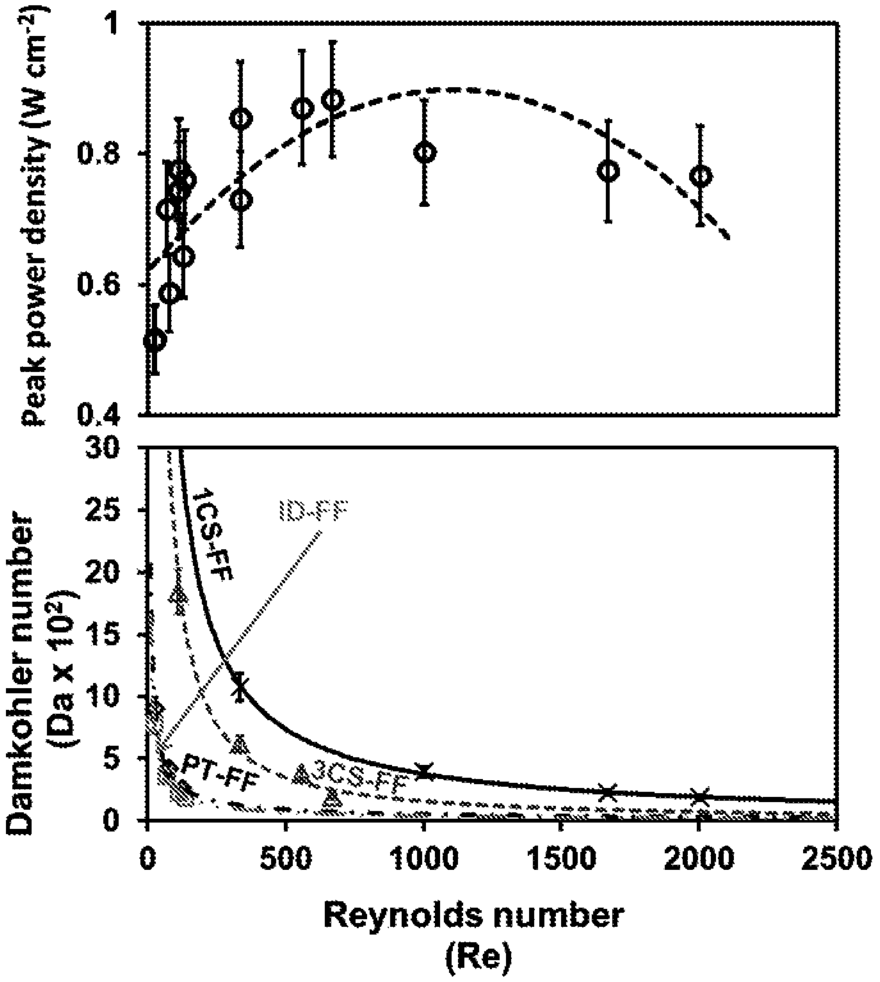
FIG. 6 is an exemplary embodiment depicting reactant-transport engineering at the DBFC anode in accordance with the present disclosure. The effect of the Reynolds number on the Damkohler number and the peak power density is shown. The error bars represent the standard error, with n=3.

Given that the effect of the flow velocity is dependent on the architecture of the flow path, comparison between FFs is best carried out using an architecture agnostic criterion such as Re. Re is defined as:

$$Re = \frac{\rho u L}{\mu} \qquad \text{(Equation 3)}$$

where r is the density of the fluid in kg $m^{-3}$, u is the fluid velocity in m $s^{-1}$, L is the characteristic length in m, and μ is the dynamic viscosity in Pa $s^{-1}$. The characteristic length (hydraulic diameter) for a square duct (in the case of the serpentine and interdigitated FFs) is the side of the square, while it is given by the following equation in the case of the rectangular cross-section for the pass-through FF:

$$L = \frac{2ab}{a+b} \qquad \text{(Equation 4)}$$

where a is the width of the rectangular cross-section and b is the length of the rectangular cross-section. Da was found to be related to the Re by an inverse power law, as depicted in FIG. 6. The peak power was found to decrease with increasing Re beyond 1,000, as seen in FIG. 6. The increasing Re indicates faster reactant transport and hence should lead to a decrease in Da. Given the difference in the characteristic times for reaction and transport, the non-linear decrease in Da is along expected lines. However, increasing Re was also found to lead to a decrease in the peak power in the region of transition between laminar and turbulent flow regimes. To explain this observation, the influence of the Re on the rate of the BOR was examined.

Full Cell Impact of Anode Reactant-Transport Engineering

The OCV and the peak power density are characteristics of the full cell, while the effect of the changes in the FF is being examined on the anode. Assuming that the reaction at the cathode is only the reduction of $H_2O_2$, the half-cell voltage at the anode ($E_{anode}$) can be calculated from the OCV after accounting for the bipolar junction potential. The relationship is as follows:

$$E_{anode} = -(OCV - E^0_{HRR} - E_j)\text{vs. } SHE. \quad \text{(Equation 5)}$$

Here, $E^0_{HRR}$=1.77 V versus SHE and $E_j$=0.83 V versus SHE. The anodic mixed potential consists of contributions from BOR and HOR (with the $H_2$ being chemically produced by the hydrolysis of the $NaBH_4$):

$$E_{anode} = \eta_{BOR}E^0_{BOR} + (1 - \eta_{BOR})E^0_{HOR} \quad \text{(Equation 6)}$$

Figure 14:
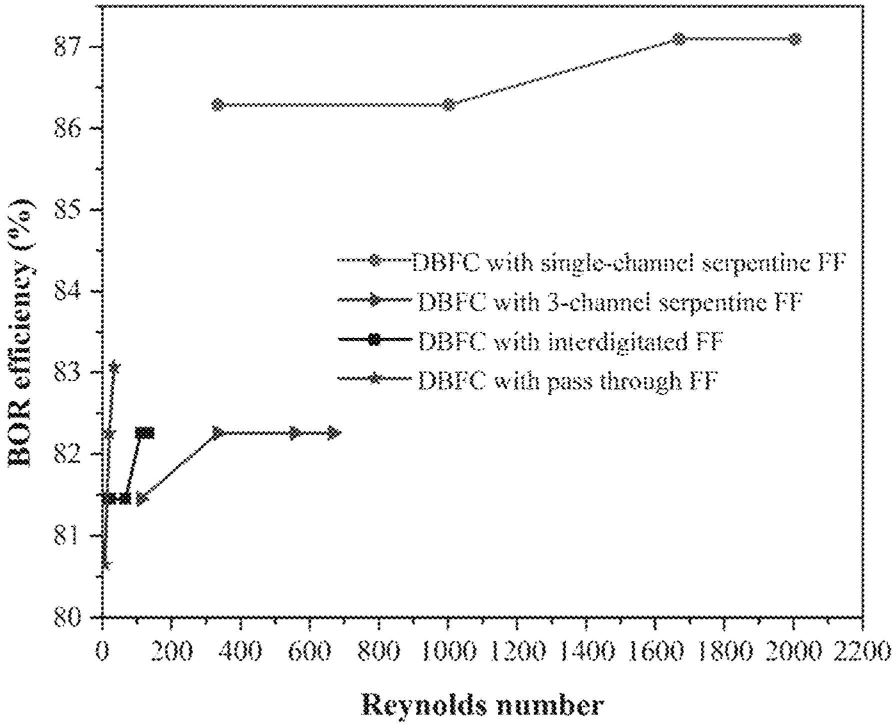
FIG. 14 is an exemplary embodiment depicting borohydride oxidation reaction (BOR) efficiencies ($\eta_{BOR}$) of a DBFC operated with different flow fields in accordance with the present disclosure. Reynolds number was varied during the operation of the DBFC.

The BOR efficiency ($\eta_{BOR}$) versus Re is depicted in FIG. 14. To deconvolute the effect of the reactant flow on the anodic reactions, the contributions from the BOR and the HOR to the cell current were elucidated.

Figure 7:
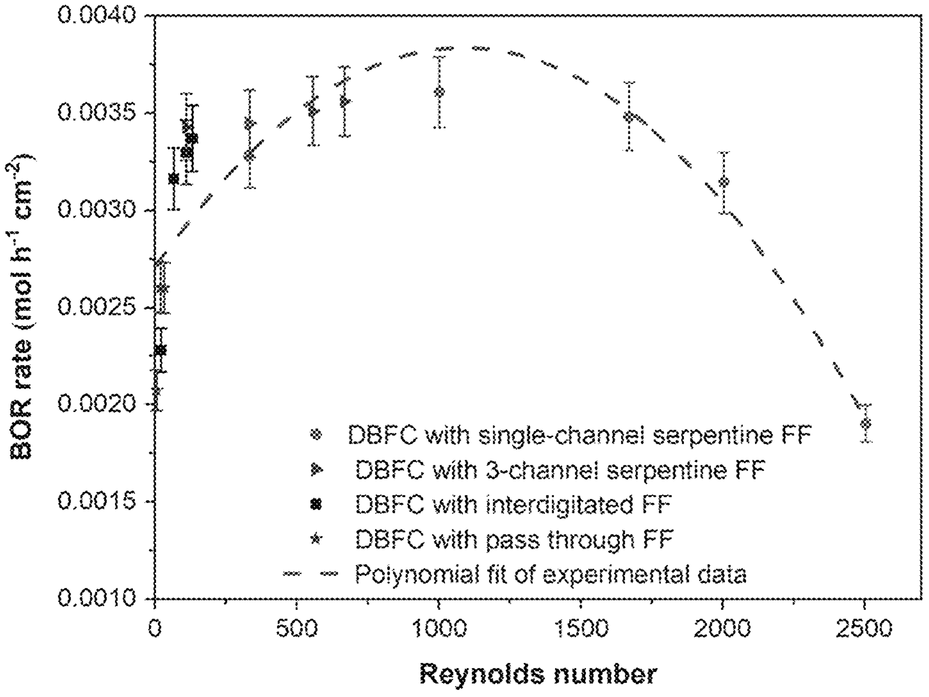
FIG. 7 is an exemplary embodiment depicting impact of the FF regime in accordance with the present disclosure. The relation between Reynolds number and borohydride oxidation reaction (BOR) rate and polynomial fit of experimental data from all FFs is shown. The error bars represent the standard error, with n=3.

FIG. 7 depicts the variation of the BOR rate with Re. Given that the overall cell current density (here, the current density at peak power is considered) has contributions from the BOR and HOR, the following relationship is obtained:

$$j_{cell} = j_{BOR} + j_{HOR} \quad \text{(Equation 7)}$$

which in turn may be written as:

$$j_{cell} = n_{BOR}Fr_{BOR} + n_{HOR}Fr_{HOR} \quad \text{(Equation 8)}$$

Given $n_{BOR}$=8, $n_{HOR}$=2, F (Faraday's constant)=96,485 C $mol^{-1}$, and $r_{BOR}/(r_{BOR}+r_{HOR})=h_{BOR}$, the $r_{BOR}$ depicted in FIG. 7 was calculated. The $r_{BOR}$ was found to increase with increasing Re as the higher velocities aid in the removal of adsorbed $H_2$ bubbles and increase the number of surface sites available for BOR. This effect was found to plateau over Re=1,000, indicating that the reaction is not limited by the availability of $NaBH_4$. Upon further increasing the flow velocity, the peak power was found to decrease. At these high flowrates, $\tau_{channel}$ and $\tau$ have similarly small values and may indicate poor penetration of the reactant flow into the catalyst layer, accounting for the decrease in peak power. The correlation between Re and $r_{HOR}$ (FIG. 15) was found to be weak, as the $H_2$ bubbles are already present at the surface and hence do not need higher flow velocities to clear out surface sites. $H_2$ production by the chemical decomposition of $NaBH_4$ is dependent on the contact time with the catalyst. In summary, it is recommended that high-power DBFCs be designed to keep the Re of the flow within their anodic channels of between 300 and 1,000 and ensure a Da between $2\times10^{-2}$ and $5\times10^{-2}$.

Extending and Supplementing Reactant-Transport Engineering

At the stack level, it is cautioned that one cannot indefinitely increase the flow velocity without eventually compromising the overall system efficiency. A clear analog is seen in the case of PEMFCs. For example, a PEMFC system model was built, incorporating stack, heat exchanger, water tank, cooling pumps, and gas-processing components (Chen et al., Parametric analysis and optimization of PEMFC system for maximum power and efficiency using MOEA/D. Appl. Therm. Eng., 121, 400-409, 2017). Upon increasing the hydrogen (anode reactant) pressure from 1 to 3 atm, the electric power output rose from 3.5 to 7.7 kW, while the system efficiency only increased from 73.6% to 76.2%. Thus, it was concluded that the power output of a fuel cell stack is not correlated with the system efficiency. In a DBFC, the flow velocity of $NaBH_4$ cannot be increased indefinitely due to both the observed decrease in peak power at higher Re and the possible decrease in overall system efficiency when accounting for pumping power requirements.

The faradaic (fuel) efficiency of BOR is usually determined by electrochemical or spectro-electrochemical methods in model conditions (well-defined noble electrocatalyst and dilute anolytes). The use of dilute $BH_4^-$ solutions for fundamental studies mitigates interference from gas bubble formation and electrode passivation by boron-oxide precipitation. However, the faradaic efficiency measured in these model experiments (in dilute $NaBH_4$ solutions) are not readily applicable under DBFC operating conditions (in concentrated $NaBH_4$ solutions). Studies with higher concentrations are precluded due to the occurrence of unwanted side reactions and challenges in maintaining a clean electrode surface due to bubble adhesion and side-product passivation. The development of selective catalysts that promote the BOR and HRR while inhibiting the hydrogen and oxygen evolution reactions (and hence improving faradaic efficiency) and systematic analysis of overall cell efficiency are valuable next steps in the development of DBFCs.

The present discussion about Da number, Re number, and BOR rate is also applicable to DBFCs operating with other oxidants or without the PMBI. However, in DBFCs operated with AEM or CEM separators, the crossover of $BH_4^-$ from anode to cathode or of $H_2O_2$ from cathode to anode, respectively, results in the loss of fuel and oxidant, and a lowering of the operating voltage thereby adversely affects performance. Thus, attempts to improve the performance of those DBFCs using the transport engineering approach may only yield limited gains in performance due to the potentially far more significant effect of the fuel-oxidant crossover.

Comparison with a PEMFC

Figure 8:
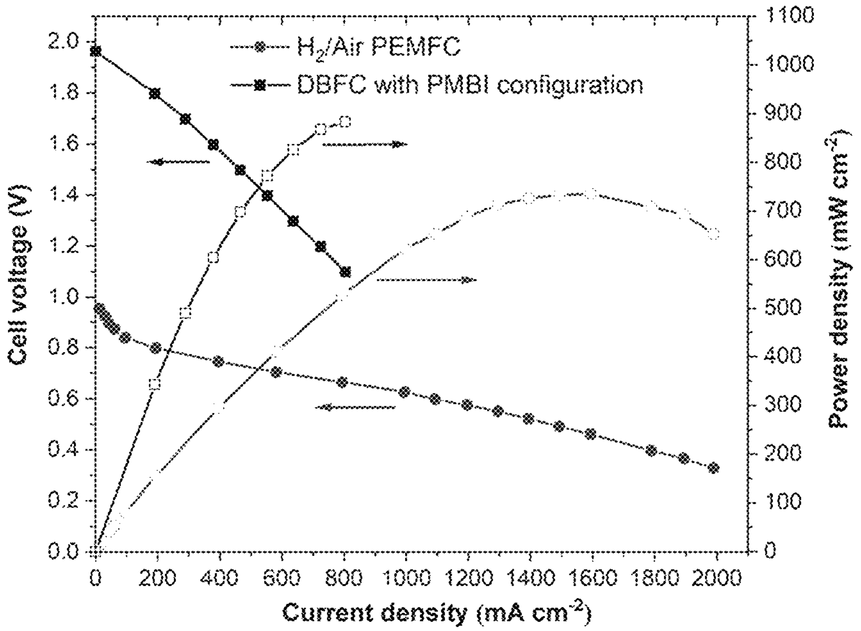
FIG. 8 is an exemplary embodiment depicting a comparison of DBFC and PEMFC in accordance with the present disclosure. The polarization curves are for a scaled-up (25 $cm^2$) PMBI-based DBFC with 3-channel serpentine FF and state-of-the-art PEMFC taken from a known device (Parrondo et al., Platinum supported on titanium-ruthenium oxide is a remarkably stable electrocatalyst for hydrogen fuel cell vehicles. Proc. Natl. Acad. Sci. USA 111, 45-50).
Figure 9:
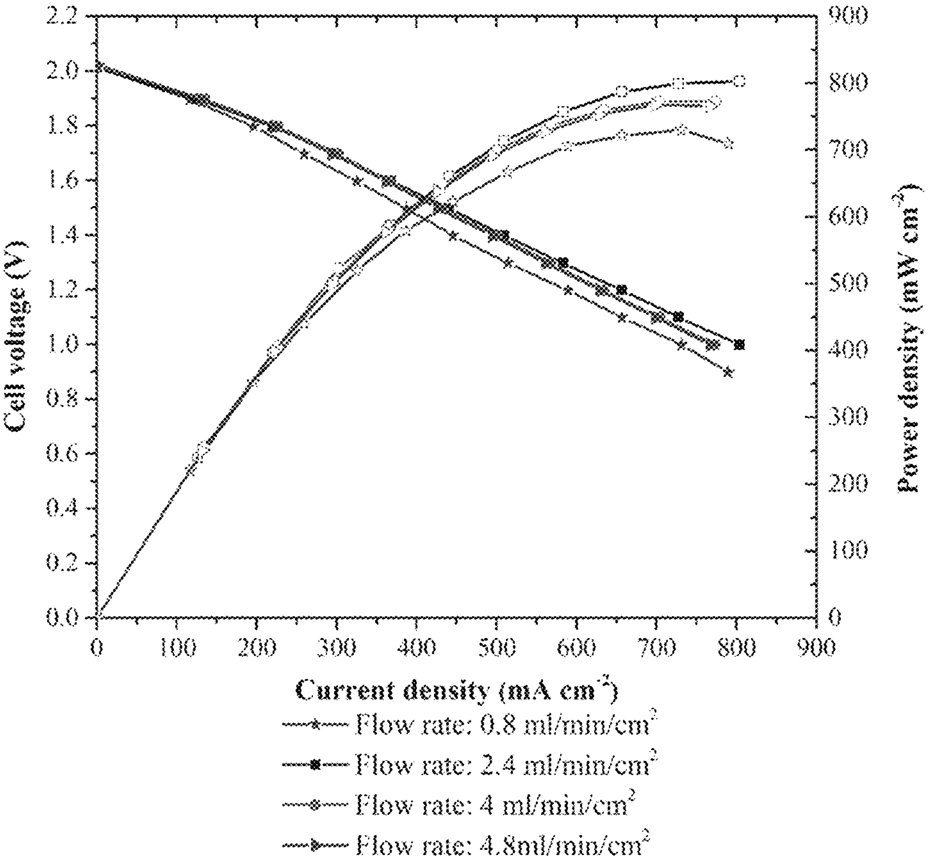
FIG. 9 is an exemplary embodiment depicting performance of a DBFC with a single-channel serpentine flow field in a 25 $cm^2$ active-area cell in accordance with the present disclosure. The flow rate was varied from 0.8 $ml/min/cm^2$ to 4.8 $ml/min/cm^2$.
Figure 10:
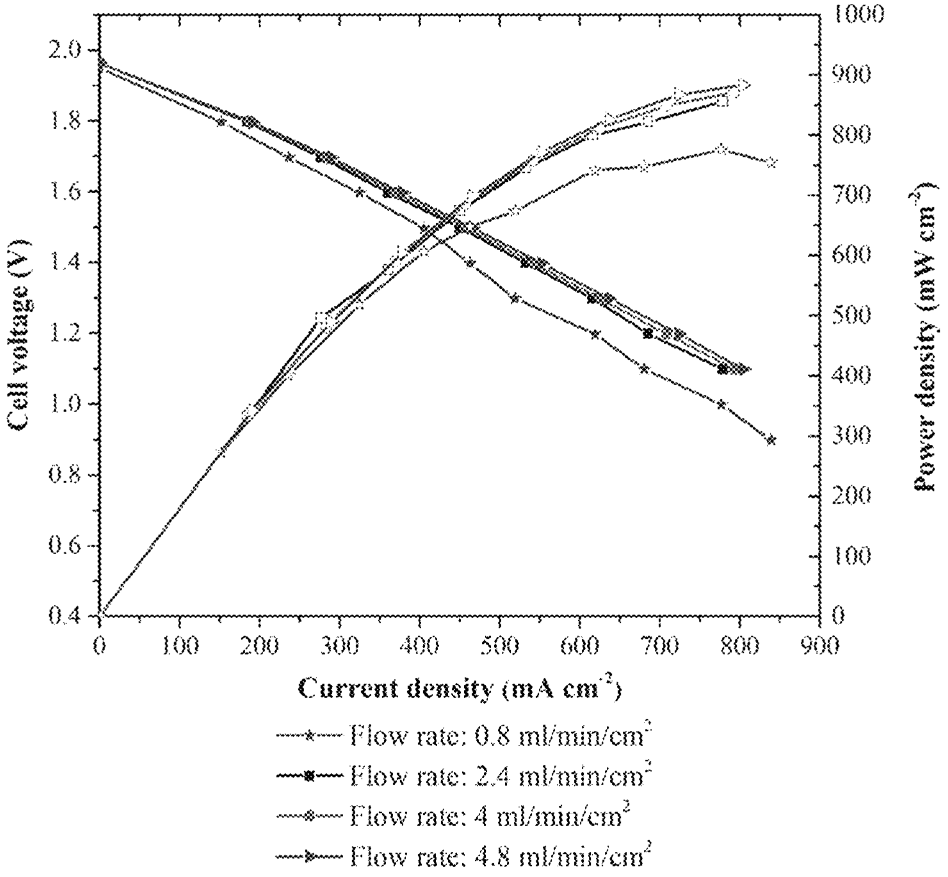
FIG. 10 is an exemplary embodiment depicting performance of a DBFC with a 3-channel serpentine flow field in a 25 $cm^2$ active-area cell in accordance with the present disclosure. The flow rate was varied from 0.8 $ml/min/cm^2$ to 4.8 $ml/min/cm^2$.
Figure 11:
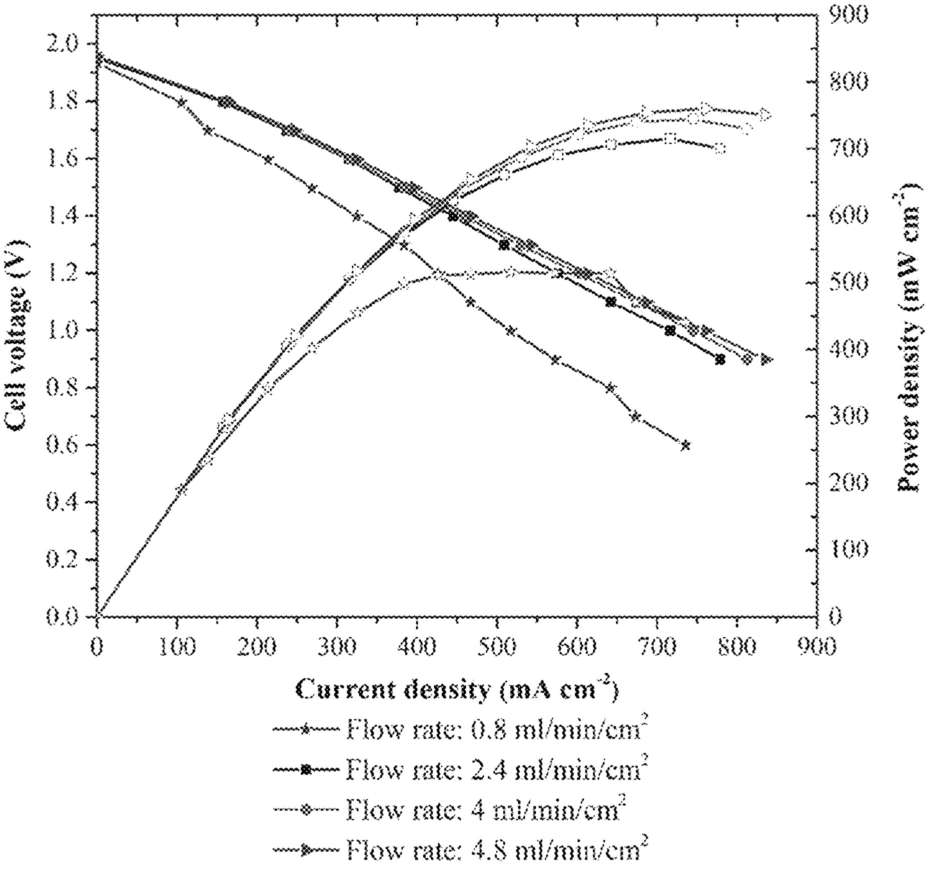
FIG. 11 is an exemplary embodiment depicting performance of a DBFC with an interdigitated serpentine flow field in a 25 $cm^2$ active-area cell in accordance with the present disclosure. The flow rate was varied from 0.8 $ml/min/cm^2$ to 4.8 $ml/min/cm^2$.
Figure 12:
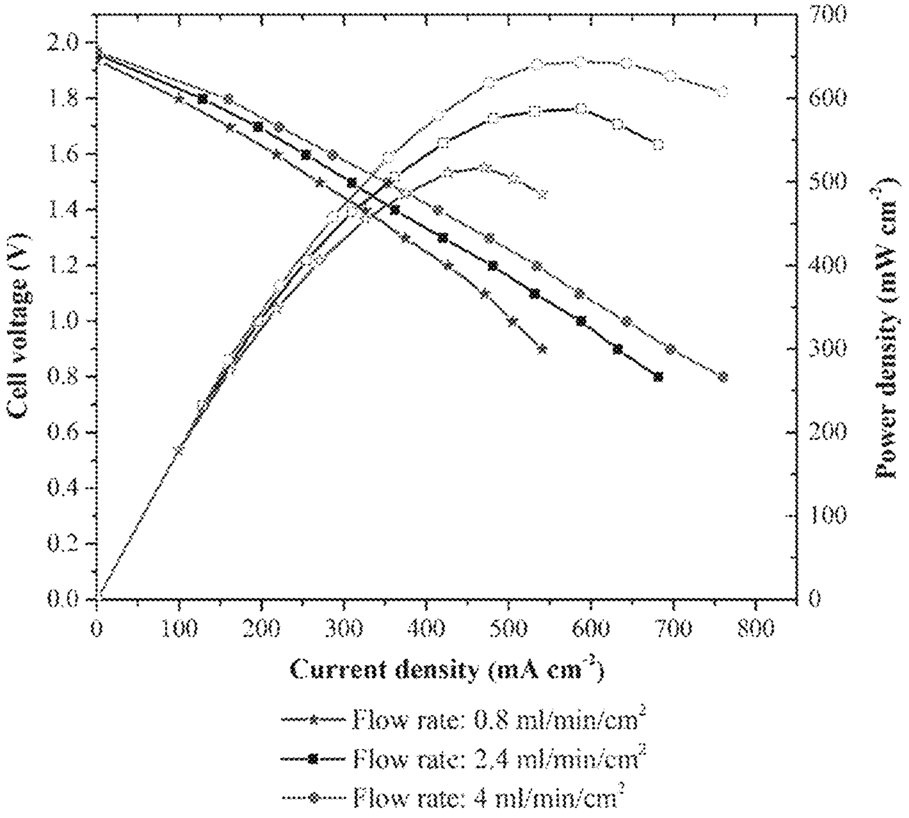
FIG. 12 is an exemplary embodiment depicting performance of a DBFC with a pass-through flow field in a 25 $cm^2$ active-area cell in accordance with the present disclosure. The flow rate was varied from 0.8 $ml/min/cm^2$ to 4.8 $ml/min/cm^2$.
Figure 13A:
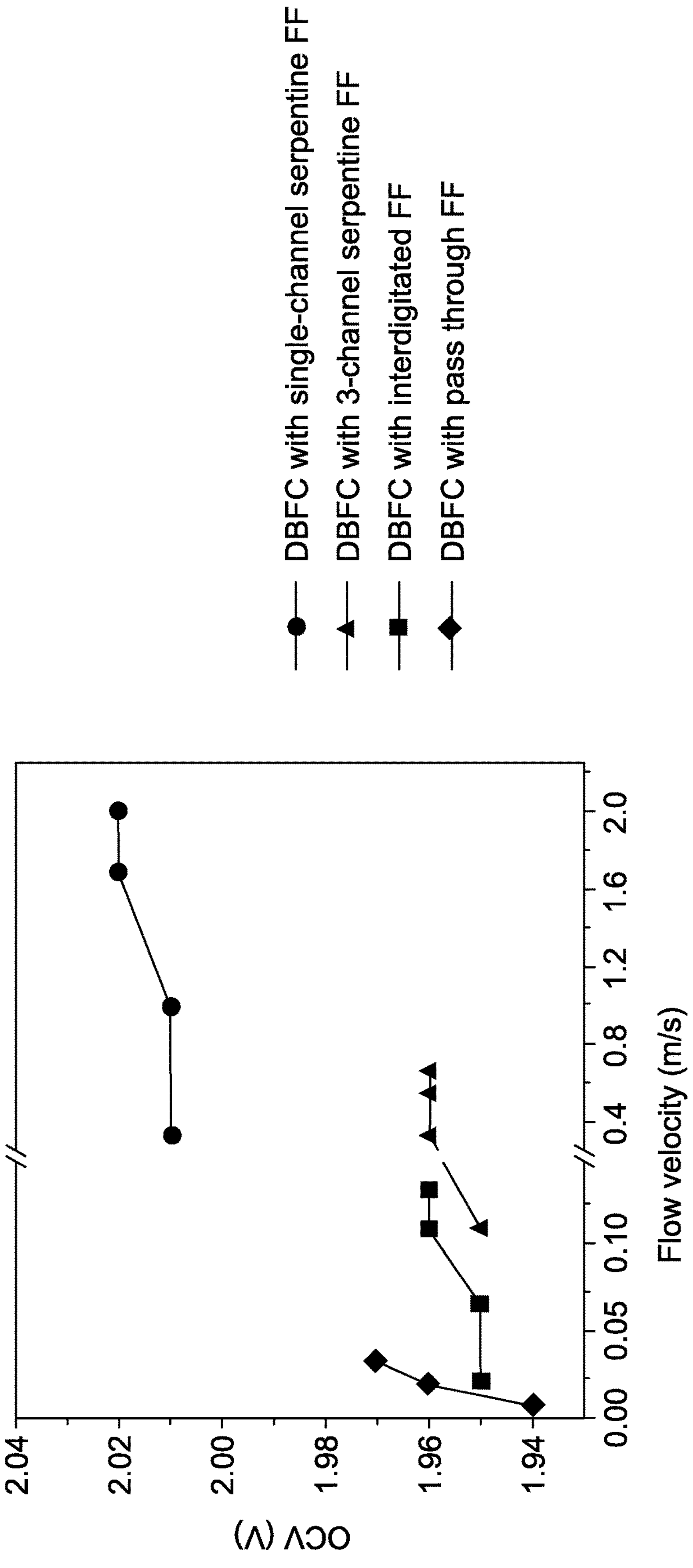
FIG. 13A is an exemplary embodiment depicting the effect of fuel flow rate at the DBFC anode in accordance with the present disclosure.
Figure 13B:
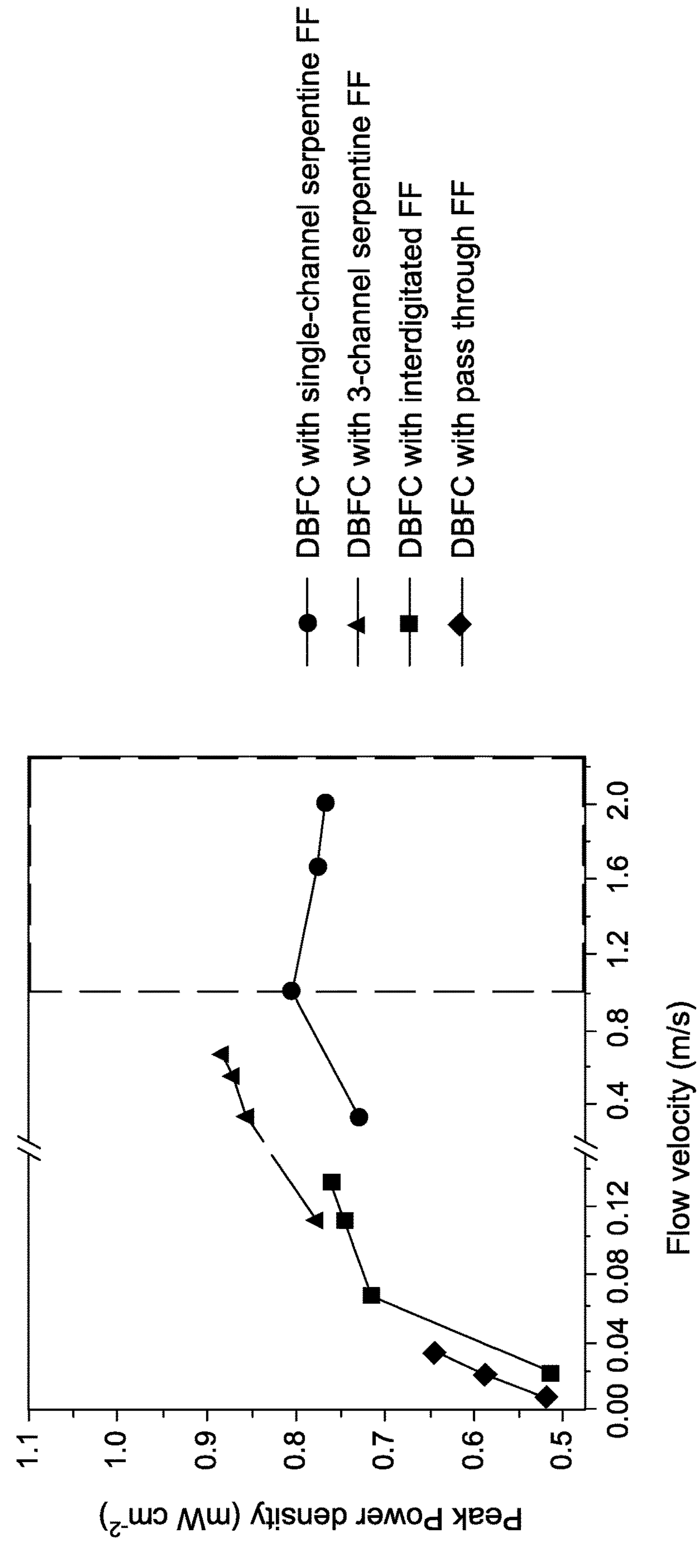
FIG. 13B is an exemplary embodiment depicting the effect of fuel flow velocity at the DBFC anode in accordance with the present disclosure.
Figure 13C:
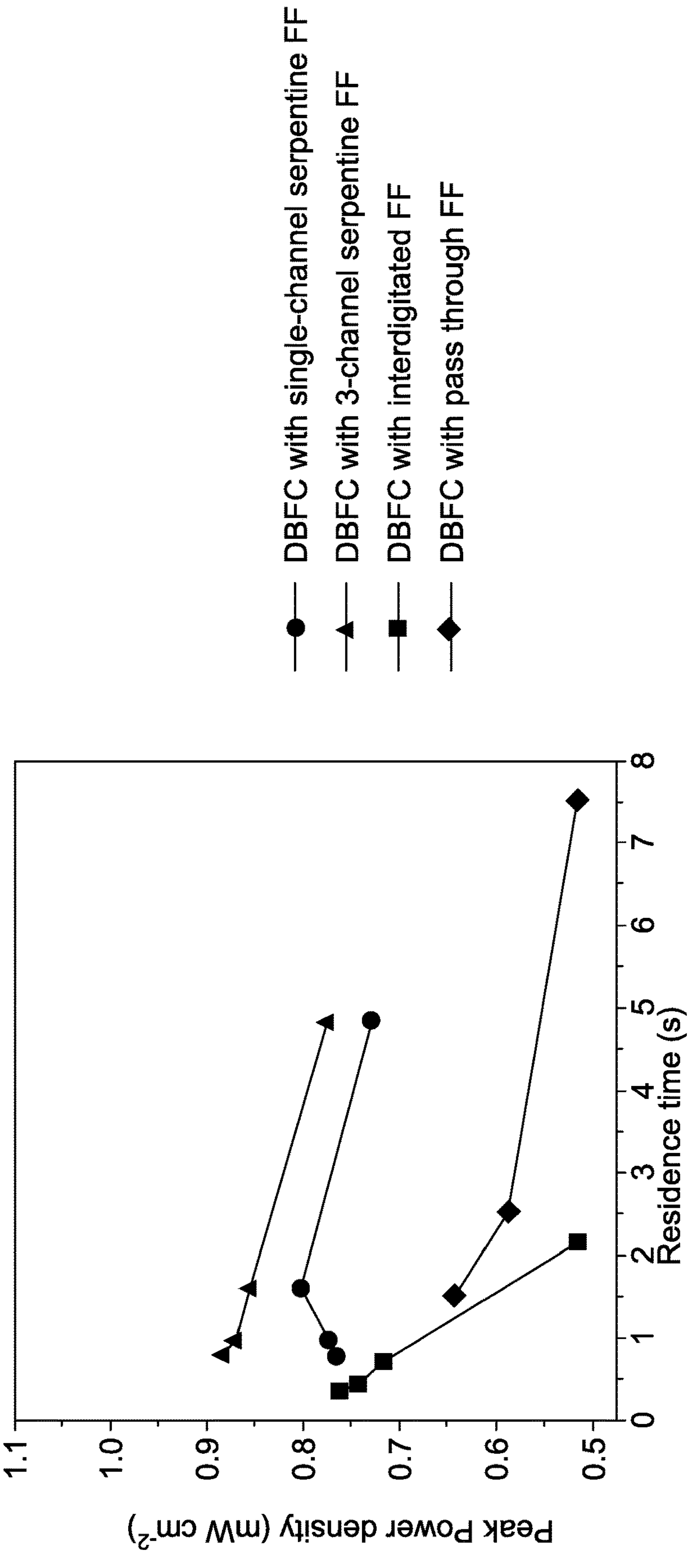
FIG. 13C is an exemplary embodiment depicting the effect of anodic channel residence time ($\tau_{channel}$) at the DBFC anode in accordance with the present disclosure.

The state-of-the-art DBFC performance using the PMBI configuration with 3CS-FF is compared with a PEMFC ($H_2$/air, unpressurized) in FIG. 8. The PEMFC yielded a power density of 295 mW $cm^{-2}$ at 0.75 V, whereas the DBFC of the present disclosure with the PMBI configuration provides a 2.4 times higher power density (705 mW $cm^{-2}$) at double the operating voltage (1.5 V). At the same operating current density (500 mA $cm^{-2}$), the voltage efficiency of the DBFC is 78%, whereas the voltage efficiency of a PEMFC is 57%. The high-voltage operation in conjunction with high power density confers twin advantages—it reduces the cost of fuel cell stacks by downsizing and considerably simplifying the design, and doubling the cell voltage potentially halves the number of cells. This is achieved without affecting power output, as current is proportional to cell area, which can be readily scaled. Thus, DBFCs can be seamlessly integrated or retrofitted into propulsion systems for weight-sensitive transportation platforms such as submersibles and drones.

A PMBI-based DBFC was reactant-transport engineered to balance competing chemical and electrochemical reactions, and this enabled a demonstration of a high power density of 890 mW $cm^{-2}$ at 1.1 V. Four different anode FF designs were investigated by using a variety of reactant and oxidant flowrates. A flow velocity of 0.4 m $s^{-1}$ for both anode and cathode was found to be sufficient to mitigate the surface-deactivating effect of adsorbed $H_2$ bubbles and obtain high power density and high OCV. The BOR rate was found to increase with increasing Re up to a critical value of Re=1,000, which was found to the be the limit of the reactant-transport engineering approach. The optimization of the various anode FFs yielded a current density of 470 mA $cm^{-2}$ at 1.5 V and a 890-mW $cm^{-2}$ peak power density at 1.1 V. This high power density at high voltage is expected to significantly lower fuel cell stack size, with advantageous implications for the design of propulsion systems for electric vehicles.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever. The starting material for the following Examples may not have necessarily been prepared by a particular preparative run whose procedure is described in other Examples. It also is understood that any numerical range recited herein includes all values from the lower value to the upper value. For example, if a range is stated as 10-50, it is intended that values such as 12-30, 20-40, or 30-50, etc., are expressly enumerated in this specification. These are only examples of what is specifically intended, and all possible combinations of numerical values between and including the lowest value and the highest value enumerated are to be considered to be expressly stated in this application.

Example 1. Preparation and Characterization of PMBI

Carbon-supported Pd catalyst (40 wt % Pd/C) was used at the anode (BOR electrode). A suspension of 0.4 g 40 wt % Pd/C catalyst in a solution of 0.17 g chloromethylated polystyrene-block-poly(ethylene-ran-butylene)-block-polystyrene (SEBS; 55:45 molar ratio of styrene to rubber) (CMSEBS55) in 9.75 mL chlorobenzene was sonicated for 7 min. The resultant ink was sprayed on a porous Ni foam electrode (1.6 mm thickness, MTI Corporation) with an airbrush (Badger model 150). The electrode was immersed in a mixture of 1-methyl-2-pyrrolidinone (NMP) (30 mL) and trimethylamine (TMA; 31%-35% wt % in ethanol) (3 mL) at 30 C for 2 days to functionalize the CMSEBS55 and yield the AEI (SEBS55-TMA).

Carbon-supported Pt catalyst (46 wt % Pt/C from Tanaka K.K.) was used at the cathode (HRR catalyst). A suspension of 0.4 g Pt/C catalyst in a solution of 3.42 g Nafion perfluorinated resin solution in 6 mL isopropanol-water mixture (1:1 weight ratio) was sonicated for 7 min. The resultant ink was sprayed on a porous carbon paper (GDL 24AA diffusion media from Ion Power) with an airbrush (Badger model 150). The nominal catalyst loadings at the anode and the cathode for the 25-$cm^2$ active area cell was 3 $mg_{catalyst}/cm^2$.

Example 2. Evaluation of Direct Borohydride Fuel Cell Performance

The performance of 25-$cm^2$ active cell area DBFC devices with the PMBI configuration was evaluated at 70° C. in a corrosion-resistant single-cell device (Fuel Cell Technologies). To construct the DBFC with the PMBI interface, the SEBS55-TMA AEI was used as the anode binder and Nafion was used as the cathode binder. Nafion 117 was used as the membrane separator. Before fuel cell testing, the anode was immersed in 1 M KOH for 4 h at room temperature and the cathode was immersed in 1 M $H_2SO_4$ for 4 h at room temperature.

The pinch (compression) used during the assembly of the fuel cell hardware for all fuel cell experiments was 3 mil on each side and the torque used to assemble the cell was 25 $lb_f$-in at each bolt. The various FF configurations—3CS-FF, 1CS-FF, IDFF, and PT-FF—were purchased from Scribner Associates. The anode FFs were varied to evaluate the impact of the FFs on the BOR, while the cathode FFs were unchanged HRR and kept as 3CS-FFs. The polarization curves of a DBFC with all of these different FFs were acquired using a Scribner Associates model 850e fuel cell test station by scanning the current from 0.8 to 800 mA $cm^{-2}$ (15 points per decade). The system was held at each current density for 2 min, and the acquisition was stopped when the voltage dropped below 0.05 V. For the DBFC tests, the fuel used was 1.5 M $NaBH_4$ in 3 M KOH and the oxidant used was 15 wt % $H_2O_2$ in 1.5 M $H_2SO_4$. The flowrates for both anode and cathode were varied from 0.8 to 4.8 mL $min^{-1}$ $cm^{-2}$.

Example 3. Measurement of Mean Residence Times Through DBFC Electrodes

The mean residence time of the DBFC anodes was measured by a step tracer experiment by using 0.15 M $V^{5+}$ in 0.3 M $H_2SO_4$ as tracer to determine the mean residence time of a DBFC (see FIG. 18). A tracer at a constant flowrate of 20 mL $min^{-1}$ was added at t=0. The concentration of the tracer in the feed to the reactor was kept at this level until the concentration in the effluent was indistinguishable from that in the feed. The effluent samples were collected at t=0, 10, 20, 30, 40, 50, 60, 80, 140, 200, 250, 310, and 400 s. Cumulative distribution curves (1-F(t) versus t) (see FIG. 5) of DBFCs with different FFs were plotted to determine the values of mean residence time of the reactors, where $F(t)=[C_{out}/C_{in}]_{step}$. The concentrations of effluent samples were measured by UV-visible spectrophotometry.

Example 4. Half-Cell and Overall Reactions in a DBFC $$\text{Anode: } BH_4^- + 8OH^- \rightarrow BO_2^- + 6H_2O + 8e^- \quad E^{0,a} = -1.24\text{V vs. SHE} \tag{1}$$

$$\text{Cathode: } 4H_2O_2 + 8H^+ + 8e^- \rightarrow 8H_2O \quad E^{0,c} = 1.77\text{V vs. SHE} \tag{2}$$

Overall reaction: $BH_4^- + 4H_2O_2 + 8H^+ + 8OH^- \rightarrow BO_2^- + 14H_2O$ $E^0 = 3.01V$ (3)

The junction potential correction has been evaluated to be:

3M KOH||1.5M $H_2SO_4$ $E_j = 0.83V$ (4)

Net cell voltage: $E^0 - E_j = 2.18V$ (5)

Example 5. Characterization

Materials

Chlorotrimethylsilane (99%), KOH (90%), chlorobenzene (99.5%), tin(IV) chloride (99.995%), chloroform (99.5%), methanol (99.9%), paraformaldehyde (99.5%), silver nitrate (0.1N), potassium thiocyanate (0.1N), sodium nitrate (99%), chloroform-d (99.96%), 1-methyl-2-pyrrolidinone (NMP, 99.7%), trimethylamine solution (TMA; 31 wt. %-35 wt. % in ethanol) and sulfuric acid (95%), hydrogen peroxide solution (30 wt. % in $H_2O$), Nafion® perfluorinated resin solution (5 wt. % in lower aliphatic alcohols and water) were purchased from Sigma Aldrich. polystyrene-block-poly(ethylene-ran-butylene)-block-polystyrene (SEBS; 55:45 molar ratio of styrene to rubber) was sourced from Kraton®. Ni foam was purchased from MTI Corporation. 46.5% Pt on Vulcan was purchased from TANAKA K. K. 40% Pd on Vulcan was purchased from Premetek Corporation. GDL 24AA (diffusion media) was purchased from Ion Power.

Synthesis of Chloromethylated SEBS (CMSEBS)

SEBS (5 g) was dissolved in chlorobenzene (250 mL). Paraformaldehyde (16.7 g) was added into the mixture and the temperature was set to 55° C. The mixture was reacted for with 7 days. The product was precipitated in methanol (1.3 L), recovered by filtration, and washed with abundant methanol. The product was purified by re-dissolving in chloroform/chlorobenzene (4:1) and re-precipitating in methanol. The purification process was repeated two times. Chloromethylation of SEBS (55:45 molar ratio of styrene to rubber) resulted in chloromethylated SEBS polymers CMSEBS55 with degrees of chloromethylation (DF; mol of chloromethyl groups per mol of polymer repeat unit) of 0.31.

Synthesis of SEBS-Based AEIs (SEBS55-TMA)

SEBS55-TMA: CMSEBS55 (0.5 g) was dissolved in chlorobenzene (9 mL). The mixture was cast onto a 3.5 in×3.5 in glass plate and the solvent was evaporated in an oven at 60° C. The membrane was peeled off and placed in a round-bottom flask containing 3 mL of trimethylamine (TMA) and 30 mL of NMP. The reaction was conducted at 30° C. for two days.

UV-Vis Spectrophotometry to Measure Mean Residence Time for Different Flow Field Mean residence time of different flow fields in DBFCs were measured through step tracer experiments by introducing vanadium ($V^{5+}$) solutions to DBFCs. The outlet concentration of vanadium solutions was monitored with time. UV-Vis spectrophotometry (500 nm wavelength) was used to measure the concentration of vanadium solutions. The standard calibration curve is shown in FIG. 16. A linear relationship between vanadium solution and readings was obtained as follows: $y=0.1873x+0.026$, $R^2=0.9974$.

Flow Field Configurations

Peak power densities vary with flow field configuration, as shown in the table below. The error bars represent the standard error with n=3.

TABLE 2

Peak power densities of DBFCs with different flow field configurations.

| Flow field | Peak power density (mW/cm$^2$) |
|---|---|
| Single-channel serpentine | 803 ± 81 |
| 3-channel serpentine | 883 ± 90 |
| Interdigitated | 751 ± 70 |
| Pass through | 608 ± 61 |

Calculation of Damkohler Number (Da)

The Damkohler number was calculated for all flow fields using Eq. (2) as described above.

Consider the case of the single-channel serpentine flow field (1CS-FF) with an anolyte flow of 60 mL min$^{-1}$ resulting in a residence time (τ) of 56.7 s. This resulted in a peak power of 803 mW cm$^{-2}$ at a voltage of 1V. Given that the BOR at the anode is ideally an 8-electron reaction, the Da can be calculated as follows:

$$D_a = \frac{\frac{0.803\ \mathrm{W\cdot cm^{-2}}}{1\mathrm{V}}}{8e^- \times 26.8\ \mathrm{A\cdot h\cdot mol^{-1}} \times 3600\ \mathrm{s\cdot h^{-1}} \times 1.5\times 10^{-3}\ \mathrm{mol\cdot cm^{-2}}} \times 56.7\ \mathrm{s} = 3.93\times 10^{-2}$$

SUMMARY

The development of high-power fuel cells could advance the electrification of the transportation sector, including marine and air transport. Liquid-fueled fuel cells are particularly attractive for such applications as they obviate the issue of fuel transportation and storage. Demonstrated herein is a direct borohydride fuel cell (DBFC) for high-power propulsion applications that delivers 0.9 W cm$^{-2}$ peak power by using a pH gradient-enabled microscale bipolar interface (PMBI) to effectively meet the incongruent pH requirements for borohydride oxidation/peroxide reduction reactions. Reactant-transport engineering of the anode flow field architecture and fuel flowrates mitigates parasitic borohydride hydrolysis and hydrogen oxidation reactions and lessens anode passivation by hydrogen bubbles. An optimal flow regime range is identified, broadly applicable to other liquid-fed fuel cells, in terms of the standard dimensionless Reynolds number (Re) and the Damkohler number (Da). DBFCs fulfilling these criteria provide a 2.4 times higher power density at 1.5 V compared to state-of-the-art polymer electrolyte membrane fuel cells (PEMFCs) that typically operate at 0.75 V. The high peak power density of 890 mW cm$^{-2}$ at 1.1 V may offer a pathway to reduce fuel cell stack size for propulsion applications.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A flow field plate comprising:

a flow field pattern;

wherein the flow field plate is configured to receive an incompressible liquid fuel stream or an incompressible liquid oxidant stream;

wherein the flow field plate is configured to operate at a Reynolds number in the range of from about 300 to about 1200;

wherein the flow field plate is configured to operate at a Damkohler number in the range of from about 200 to about 600; and wherein the flow field plate is configured to produce $H_2$ bubbles and remove adsorbed $H_2$ bubbles before they react.

2. The flow field plate of claim 1, wherein the flow field pattern comprises a pattern selected from the group consisting of a single-channel serpentine, a 3-channel serpentine, an interdigitated pattern, a pass-through pattern, a pin-type pattern, a pillar-type pattern, a fractal pattern, and combinations thereof.

3. The flow field plate of claim 1, wherein the incompressible liquid fuel stream comprises an incompressible liquid fuel component selected from the group consisting of an incompressible liquid fuel, sodium borohydride ($NaBH_4$), potassium borohydride ($NaBH_4$), sodium hydroxide (NaOH), potassium hydroxide (KOH), and combinations thereof.

4. The flow field plate of claim 1, wherein the incompressible liquid oxidant stream comprises an incompressible liquid oxidant component selected from the group consisting of an incompressible liquid oxidant, hydrogen peroxide ($H_2O_2$), an acid, sulfuric acid ($H_2SO_4$), hydrobromic acid, and combinations thereof.

5. The flow field plate of claim 1, wherein the incompressible liquid fuel stream has a basic pH and the incompressible liquid oxidant stream has an acidic pH.

6. A fuel cell comprising:

an anode comprising a first flow field plate comprising a flow field pattern; and an incompressible liquid fuel stream;

wherein the first flow field plate is configured to operate at a Reynolds number in the range of from about 300 to about 1200; and wherein the first flow field plate is configured to operate at a Damkohler number in the range of from about 200 to about 600; and a cathode comprising a second flow field plate comprising a flow field pattern; and an incompressible liquid oxidant stream;

wherein the second flow field plate is configured to operate at a Reynolds number in the range of from about 300 to about 1200; and wherein the second flow field plate is configured to operate at a Damkohler number in the range of from about 200 to about 600; and wherein the first flow field plate and/or the second flow field plate is configured to produce $H_2$ bubbles and remove adsorbed $H_2$ bubbles before they react.

7. The fuel cell of claim 6, wherein the first flow field pattern comprises a pattern selected from the group consisting of a single-channel serpentine, a 3-channel serpentine, an interdigitated pattern, a pass-through pattern, a pin-type pattern, a pillar-type pattern, a fractal pattern, and combinations thereof.

8. The fuel cell of claim 6, wherein the second flow field pattern comprises a pattern selected from the group consisting of a single-channel serpentine, a 3-channel serpentine, an interdigitated pattern, a pass-through pattern, a pin-type pattern, a pillar-type pattern, a fractal pattern, and combinations thereof.

9. The fuel cell of claim 6, wherein the first flow field pattern is identical to the second flow field pattern.

10. The fuel cell of claim 6, wherein the first flow field pattern is different from the second flow field pattern.

11. The fuel cell of claim 6, wherein the incompressible liquid fuel stream comprises an incompressible liquid fuel component selected from the group consisting of an incompressible liquid fuel, sodium borohydride ($NaBH_4$), potassium borohydride ($NaBH_4$), sodium hydroxide (NaOH), potassium hydroxide (KOH), and combinations thereof.

12. The fuel cell of claim 6, wherein the incompressible liquid oxidant stream comprises an incompressible liquid oxidant component selected from the group consisting of an incompressible liquid oxidant, hydrogen peroxide ($H_2O_2$), an acid, sulfuric acid ($H_2SO_4$), hydrobromic acid, and combinations thereof.

13. The fuel cell of claim 6, wherein the incompressible liquid fuel stream has a basic pH and the incompressible liquid oxidant stream has an acidic pH.

14. The fuel cell of claim 6, wherein the fuel cell comprises a pH gradient-enabled microscale bipolar interface (PMBI).

15. A method of using a fuel cell comprising:

an anode comprising a first flow field plate comprising a flow field pattern; and an incompressible liquid fuel stream;

wherein the first flow field plate is configured to operate at a Reynolds number in the range of from about 300 to about 1200; and wherein the first flow field plate is configured to operate at a Damkohler number in the range of from about 200 to about 600; and a cathode comprising a second flow field plate comprising a flow field pattern; and an incompressible liquid oxidant stream;

wherein the second flow field plate is configured to operate at a Reynolds number in the range of from about 300 to about 1200; and wherein the second flow field plate is configured to operate at a Damkohler number in the range of from about 200 to about 600, the method comprising using the fuel cell in a propulsion system of a vehicle;

wherein the first flow field plate and/or the second flow field plate is configured to produce $H_2$ bubbles and remove adsorbed $H_2$ bubbles before they react.

16. The method of claim 15, wherein the first flow field pattern is identical to the second flow field pattern.

17. The method of claim 15, wherein the first flow field pattern is different from the second flow field pattern.

18. The method of claim 15, wherein the fuel cell comprises a pH gradient-enabled microscale bipolar interface (PMBI).

19. The method of claim 15, wherein the vehicle is a weight-sensitive transportation platform.

20. The method of claim 15, wherein the vehicle is selected from the group consisting of electric vehicles, submersibles, drones, manned and unmanned aerial vehicles, surface ships, and combinations thereof.

* * * * *